(12) United States Patent
Sharma et al.

(10) Patent No.: US 11,134,786 B2
(45) Date of Patent: Oct. 5, 2021

(54) FURNITURE WITH A BUILT-IN JOYRIDE

(71) Applicants: Vikram Sharma, Saratoga, CA (US); Ritu Sharma, Saratoga, CA (US)

(72) Inventors: Vikram Sharma, Saratoga, CA (US); Ritu Sharma, Saratoga, CA (US)

( * ) Notice: Subject to any disclaimer, the term of this patent is extended or adjusted under 35 U.S.C. 154(b) by 0 days.

(21) Appl. No.: 16/732,466

(22) Filed: Jan. 2, 2020

(65) Prior Publication Data

US 2020/0138200 A1 May 7, 2020

Related U.S. Application Data

(60) Provisional application No. 62/928,360, filed on Oct. 31, 2019.

(51) Int. Cl.
*A47C 17/04* (2006.01)
*A47C 31/00* (2006.01)
*A47C 17/86* (2006.01)
*A63G 31/16* (2006.01)
*A63F 13/28* (2014.01)

(52) U.S. Cl.
CPC .............. *A47C 17/04* (2013.01); *A47C 17/86* (2013.01); *A47C 31/008* (2013.01); *A63F 13/28* (2014.09); *A63F 2250/02* (2013.01)

(58) Field of Classification Search
CPC ........ A63G 31/00; A63G 31/02; A63G 31/04; A63G 31/16; G09B 19/00; G09B 19/02; G09B 19/16
USPC .......................... 472/59–61, 130; 434/29, 55
See application file for complete search history.

(56) References Cited

U.S. PATENT DOCUMENTS

| 6,139,324 | A | * | 10/2000 | Roy | G09B 9/00 434/55 |
| 6,468,082 | B1 | * | 10/2002 | Denne | F15B 11/036 434/55 |
| 6,656,137 | B1 | * | 12/2003 | Tyldsley | A61M 21/00 434/185 |
| 6,733,293 | B2 | * | 5/2004 | Baker | G09B 9/08 434/55 |
| 8,454,366 | B2 | * | 6/2013 | Orban | A63F 13/28 434/29 |
| 9,586,152 | B1 | * | 3/2017 | Lee | G09B 9/02 |
| 10,226,125 | B2 | * | 3/2019 | Park | A47C 1/02 |
| 2015/0354748 | A1 | * | 12/2015 | Kang | F16M 11/2035 248/371 |

(Continued)

*Primary Examiner* — Kien T Nguyen

(57) ABSTRACT

The present invention discloses a joyride mechanism for a furniture such as a bed, chair, sofa, crib, and the like, having attachments designed to impart a movement to the furniture for enjoyment purposes. The present invention provides an apparatus for applying vertical and horizontal motion to the furniture. The apparatus includes a mechanical frame with linear actuators (such as electrical linear actuators, hydraulic actuators or pneumatic linear actuators, or any combination thereof) that are controlled by a computer. The apparatus can optionally control illumination and speeds of multiple fans to provide a joyride experience to users of the furniture. The present invention also discloses a furniture with built-in sensors to determine the safety of users or people in proximity of the furniture. The present invention also discloses a mattress for a bed with a built-in computer. The present invention also discloses cushions for furniture with a built-in computer.

18 Claims, 24 Drawing Sheets

(56) References Cited

U.S. PATENT DOCUMENTS

2016/0236101 A1\* 8/2016 Danieau ................ G09B 23/28

\* cited by examiner

FURNITURE WITH A BUILT-IN JOYRIDE

CROSS-REFERENCE TO RELATED PATENT DOCUMENTS

This patent application claims the benefit of priority of U.S. Provisional Application No. 62/928,360 entitled "A bed with a built-in Joyride," filed Oct. 31, 2019, which are hereby incorporated herein by reference in its entirety.

FIELD OF THE INVENTION

The present application generally relates to a joyride mechanism for a furniture such as a bed, chair, sofa, crib, and the like, and more particularly to attachments designed to impart a movement to the furniture for enjoyment purposes.

BACKGROUND

Adjustable furniture, such as beds, sofas, chairs, and other furniture, may include one or more sections of which a user may control a feature, such as a position, vibration, motion, or the like of that one or more sections. The user may typically adjust the furniture by using a control, which may be an on-furniture controller or a remote controller, to move an adjustable section in one or more directions. Additionally, the adjustable furniture may include various types of mattresses, cushions, pillows, or similar elements to cushion the furniture for the user, and the furniture may allow for movement, vibration, heating, cooling, or other action related to one or more of the sections. Such arrangements of the furniture can provide a joyride to the user.

It has long been recognized that enjoying a joyride increases relaxation in most human beings. Also, furniture, such as beds, sofas, chairs, and other furniture, is a part of most homes and hotels where people relax and enjoy. By imparting various motions to a bed, sofa, chair, or the like, a lot of enjoyment can be added to a person's life. Currently, joyrides are installed at public spaces, such as shopping malls or amusement parks, for the users with the expectations that other users can watch while few users experience the joyride. A piece of furniture with a built-in joyride includes one or several mechanisms which allow different movements to different portions of the furniture to be tilted or otherwise positionally moved. A fun experience of individuals may be enhanced by providing a furniture that swings, moves to a beat, rhythm, or scares the individual with a computer-controlled motion. Although various mechanisms for adjusting the configuration of a furniture are known, the art is still without a furniture assembly built for joy which includes, and is remotely controlled by, a simplified remote-control unit. In light of the above-mentioned background, there is a need for a technical solution that solves the above-mentioned problems and provides a seamless mechanism for facilitating a movable piece of furniture with infotainment features for experiencing a joyride. Having a furniture that can provide a joyride experience can help the users have a unique private experience with their significant others. A family can also enjoy joyrides together in its private space. Some people also enjoy music while their body swings to a beat. Enjoying music on a furniture that moves in synchronization with the beats of music, lights and breeze can also provide an enjoyable and relaxing experience to the user. Thus, what is needed is a joyride mechanism for a furniture such as a bed, chair, sofa, crib, and the like having attachments designed to impart a movement to the furniture for enjoyment purposes. The furniture may also include built-in sensors such as position sensors, level sensors, force sensors, proximity sensors, optical cameras or optical sensors, temperature sensors, accelerometers, gyroscopes, vibration sensors, or other sensors that provide inputs to a built-in computer. This computer uses these inputs to control actuators and other mechanical or electrical components to provide a safe, enjoyable experience to users.

SUMMARY

It will be understood that this disclosure is not limited to the particular systems and methodologies described herein, as there can be multiple possible embodiments of the present disclosure which are not expressly illustrated in the present disclosure. It is also to be understood that the terminology used in the description is for the purpose of describing the particular versions or embodiments only and is not intended to limit the scope of the present disclosure.

It is an objective of the present invention to provide a joyride mechanism for a furniture such as a bed, chair, sofa, crib, and the like, having attachments designed to impart a movement to the furniture for enjoyment purposes.

It is another objective of the present invention to provide an apparatus for applying vertical and horizontal motion to a furniture such as a bed, chair, sofa, crib, and the like.

It is another objective of the present invention to provide an apparatus that includes a mechanical frame with linear actuators (such as electrical linear actuators, hydraulic linear actuators or pneumatic linear actuators, or any combination thereof) that are controlled by a built-in computer.

It is another objective of the present invention to provide an apparatus that can optionally control illumination and speeds of multiple fans to provide a joyride experience to users of the furniture.

It is another objective of the present invention to provide an apparatus for synchronizing music to the movements of the furniture.

It is another objective of the present invention to provide users with a unique experience with entertainment synchronized with movements, illumination as well as effect of fans. This entertainment could be a virtual reality entertainment but could be other entertainment such as music, songs, movies, television, or sports.

The present invention discloses an apparatus for applying a three-dimensional motion including vertical and horizontal motion to a furniture such as a bed, chair, sofa, crib, and the like. The apparatus includes a mechanical frame with linear actuators that are controlled by a built-in computer. The supported motion may be along a horizontal x-axis, a horizontal y-axis, a vertical motion, or any combination thereof. The linear actuators may correspond to electrical linear actuators, hydraulic linear actuators or pneumatic linear actuators, or any combination thereof. The apparatus can optionally control illumination and speeds of multiple fans to provide a joyride experience to users of the furniture. The computer that controls the movements of the furniture, illumination of the furniture light, and speeds of the fans may be programmed remotely by an application running on a cellular device or another tablet, laptop or another computer. The movements of the furniture, illumination of the furniture light, the speeds of the fans may also be programmed by a remote device using an easy to use interface. Experts in a field of synchronizing the music to the movements can create files to capture the movements, illumination, fan speeds information with respect to a piece of music, entertainment, or the like. These files with synchronized information may be hosted on remote servers. These files may also be remotely downloaded to the computer that controls the movements of the furniture, illumination of the furniture lights, speeds of the furniture fans, or the music. This can provide the users a unique experience with entertainment synchronized with movements, illumination as well as effect of fans. The apparatus may be created and used with a subset of features such as only horizontal movement in one or more directions without any other movement.

Another example could be horizontal movement in 2 directions with vertical movement with illumination effects and controlled fans.

Another example could be horizontal and vertical movements with synchronized illumination and synchronized controlled fans with music player built-into the furniture.

It is another objective of the present invention to provide a furniture such as a bed having a bed form factor of a moving machine for enjoying virtual reality. It is another objective of the present invention to provide furniture such as a sofa, chair, chaise or other form furniture having a sofa, chair, chaise or other form furniture factor of a moving machine for enjoying virtual reality. There is further provided a cover for a piece of furniture, wherein the cover covers moving parts to make sure that it is safe for occupants/people or pets near the furniture.

It is another objective of the present invention to provide a piece of software application that is running on a mobile device or a computer or a touchscreen device. The software application facilitates for selecting a program to run on the computer built-into the furniture. The program that is selected is for a joyride for occupants of the furniture. Further, programming a joyride in a chair, bed or other form factor is to be synchronized with entertainment, and it include direction, position, speed information, illumination control, and fan speed control with respect to time. The programming is also applicable for virtual reality entertainment.

It is another objective of the present invention to use built-in sensors, such as position sensors, level sensors, force sensors, proximity sensors, optical cameras or optical sensors, temperature sensors, accelerometers, gyro-sensors, vibration sensors, or other sensors, that provide inputs to a built-in computer of a furniture having joyride mechanism. This computer may use these inputs to determine the safety of users or people/pets near the furniture and generate alerts. Further, the computer may use these inputs to control the actuators and other mechanical or electrical components to provide a safe and enjoyable experience to the users of the furniture. The position sensors may be used by the computer to figure out when to stop motors of the furniture or reverse the motors depending on where the moving part of the furniture is. For example, for a bed, if the bed has moved to the extreme "x" value, the position sensors may indicate that to the computer. At that point, the computer will no longer supply current to the motors to drive it in the same direction. The level sensors may help determine the extreme position in case of hydraulic or pneumatic linear actuators. However, the position sensors may also be used in conjunction with the hydraulic or pneumatic actuators. The proximity sensors placed around the furniture can make sure that the movement of the furniture does not hit anyone near the furniture. If the proximity sensors trigger, the motion of the furniture may be slowed or stopped to avoid injuries. The optical sensors or cameras can also serve the same purpose by making sure that the movement of the furniture does not hit anyone occupying the furniture or near the furniture. The force sensors are used in the furniture to make sure that the load is not exceeding the capacity of the actuators or the built-in frame to make sure that it does not malfunction and cause injuries to the occupants or those near it. The temperature sensors near the motors, actuators, and on the moving components may sense the temperature. The computer may use this data to make sure that these components are not overheating that may lead to malfunction of the furniture or cause other safety or comfort issues. The vibration sensors may provide data to the computer. Such data can be used to determine that the ongoing ride is within acceptable parameters so that the ride is enjoyable. The accelerometers may detect when the load is out of balance and the computer using that input can then switch OFF or slow down the motors to make sure the acceleration is within limits and the users do not get thrown out of the furniture. This will also make sure the ride remains comfortable to the users. Similarly, the gyro-sensors may be used to determine angular velocity, vibration sensing, and angle sensing to make the ride safe and enjoyable for the users.

It is another objective of the present invention to provide the users with a specialized mattress for the furniture (such as a bed) with a built-in computer which provides the comfort and safety to the users of the furniture. This mattress is attached or strapped to the bed to make sure that it restricts the movement of the mattress with respect to the bed. This could include mattresses with built-in notches or pockets through which belts can go. These belts are attached to the bed. Similarly, it is an objective of the present invention to provide the users with cushions for the furniture with a built-in computer. These cushions are strapped or attached to the furniture in such a way as to make sure that it restricts the movement of the cushions with respect to the furniture. This could include cushions with built-in notches or pockets through which belts can go. These belts are attached or strapped to the furniture.

It is another objective of the present invention to provide a safe experience for a user using the joyride furniture. Preventing the user from accidentally accessing the moving parts of the ride is a built-in feature of the present invention. Also, having soft pads around the furniture and slowing/stopping the furniture to prevent injuries to pets or people near the furniture is a built-in feature of the present invention.

These and other features and advantages of the present invention will become apparent from the detailed description below, in light of the accompanying drawings.

BRIEF DESCRIPTION OF ACCOMPANYING DRAWINGS

The novel features which are believed to be characteristic of the present invention, as to its structure, organization, use and method of operation, together with further objectives and advantages thereof, will be better understood from the following drawings in which a presently preferred embodiment of the invention will now be illustrated by way of various examples. It is expressly understood, however, that the drawings are for the purpose of illustration and description only and are not intended as a definition of the limits of the invention. Embodiments of this invention will now be described by way of example in association with the accompanying drawings in which:

Figure 24:
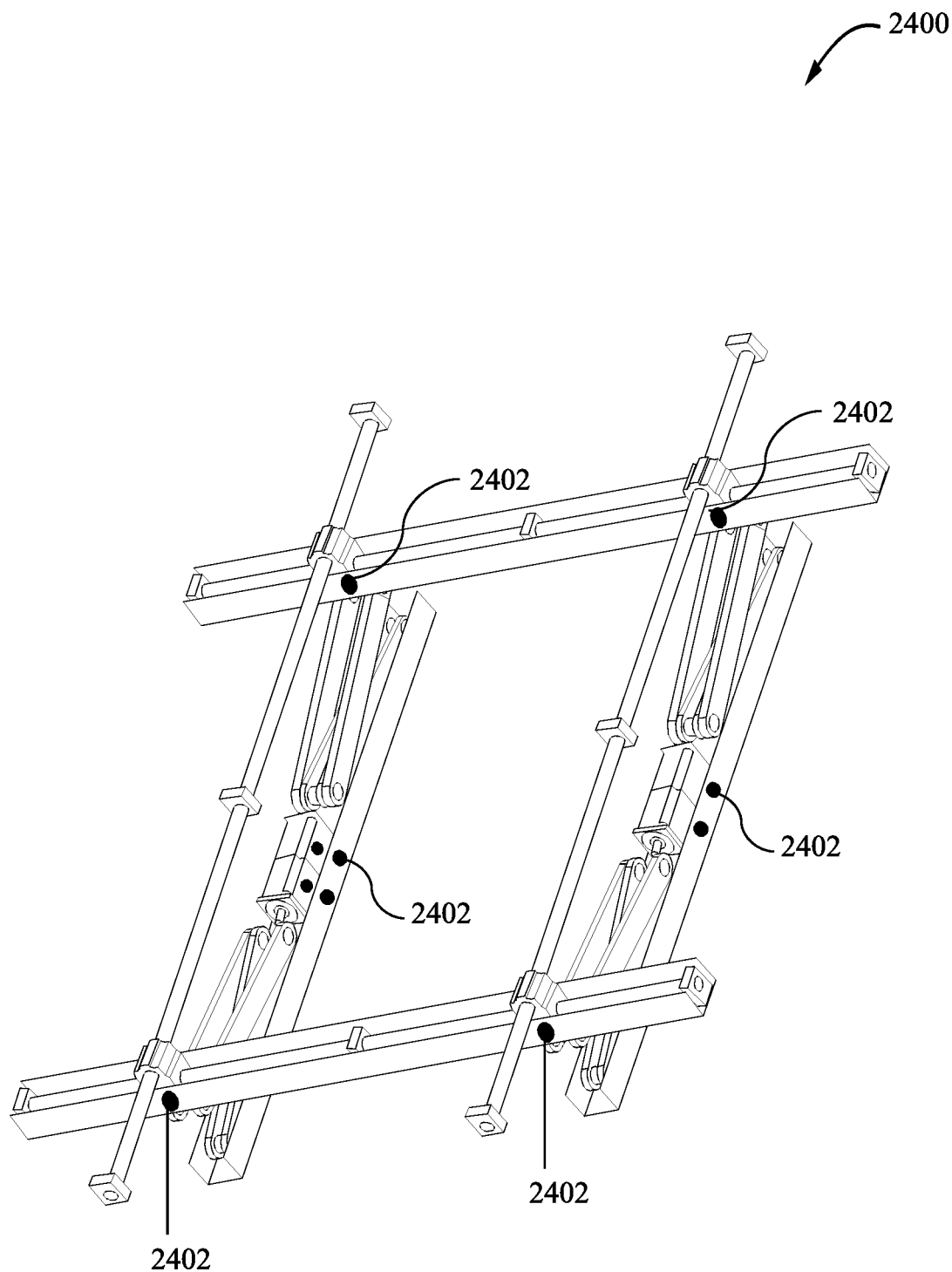
Figure 25:
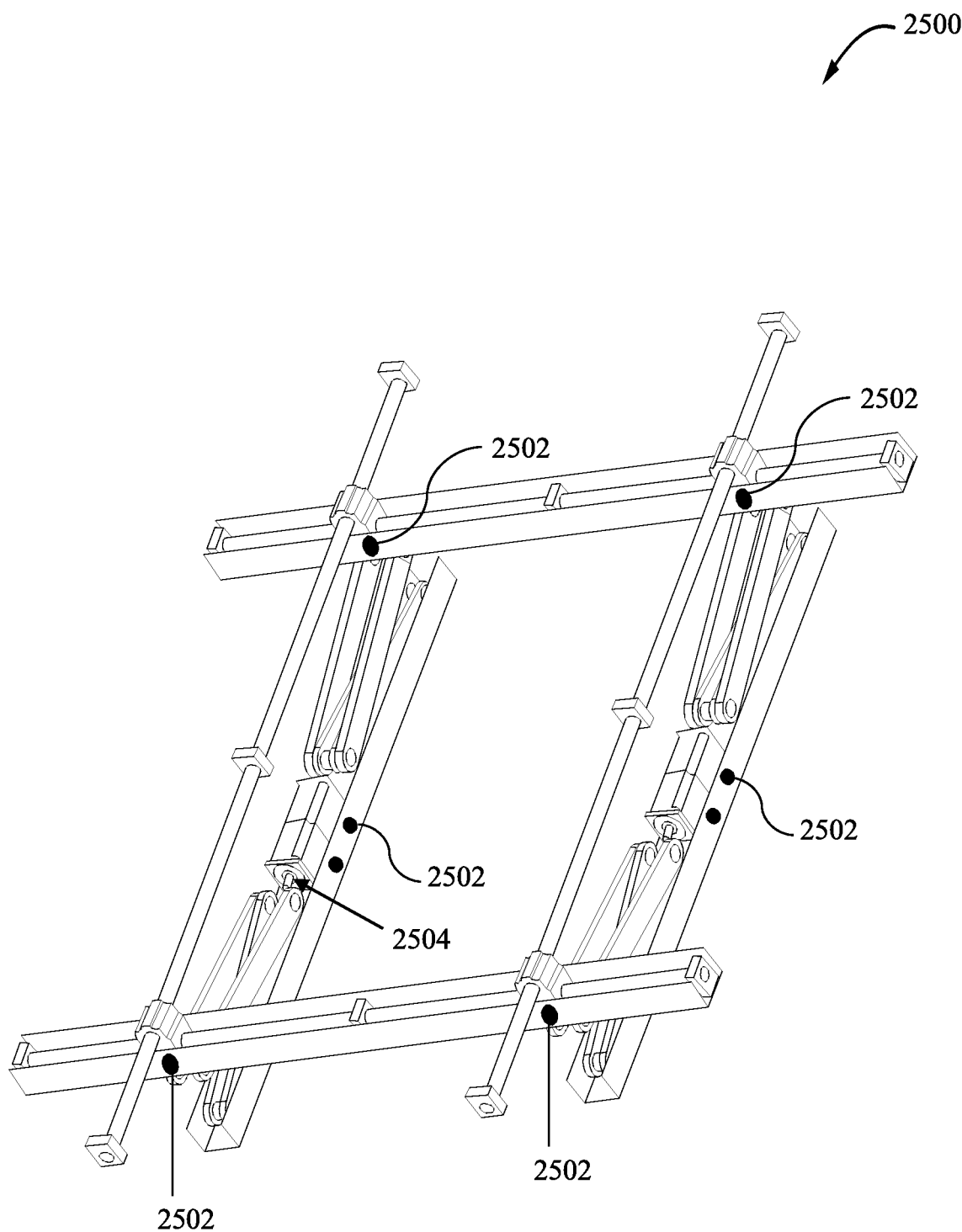

FIG. 24 is a diagram that shows temperature sensors integrated near motors and other moving areas of the furniture to detect that the temperature is within acceptable range of operation, according to an exemplary embodiment of the present invention; and FIG. 25 is a diagram that shows position where accelerometer, gyro sensors, or vibration sensors could be placed in operation, according to an exemplary embodiment of the present invention.

Further areas of applicability of the present invention will become apparent from the detailed description provided hereinafter. It should be further understood that the detailed description of exemplary embodiments is intended for illustration purposes only and is, therefore, not intended to necessarily limit the scope of the invention.

DETAILED DESCRIPTION

As used in the specification and claims, the singular forms "a", "an" and "the" may also include plural references. For example, the term "an article" may include a plurality of articles. Those with ordinary skill in the art will appreciate that the elements in the figures are illustrated for simplicity and clarity and are not necessarily drawn to scale. For example, the dimensions of some of the elements in the figures may be exaggerated, relative to other elements, in order to improve the understanding of the present invention. There may be additional components described in the foregoing application that are not depicted on one of the described drawings. In the event such a component is described, but not depicted in a drawing, the absence of such a drawing should not be considered as an omission of such design from the specification.

Before describing the present invention in detail, it should be observed that the present invention utilizes a combination of components, which constitutes an apparatus that facilitates a joyride mechanism in a furniture such as a bed, chair, sofa, crib, and the like, having attachments designed to impart a movement to the furniture for enjoyment purposes. Accordingly, the components have been represented, showing only specific details that are pertinent for an understanding of the present invention so as not to obscure the disclosure with details that will be readily apparent to those with ordinary skill in the art having the benefit of the description herein. As required, detailed embodiments of the present invention are disclosed herein; however, it is to be understood that the disclosed embodiments are merely exemplary of the present invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the present invention.

References to "one embodiment", "an embodiment", "another embodiment", "yet another embodiment", "one example", "an example", "another example", "yet another example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

The words "comprising", "having", "containing", and "including", and other forms thereof, are intended to be equivalent in meaning and be open ended in that an item or items following any one of these words is not meant to be an exhaustive listing of such item or items or meant to be limited to only the listed item or items.

Unless stated otherwise, terms such as "first" and "second" are used to arbitrarily distinguish between the elements or entities. Thus, these terms are not necessarily intended to indicate temporal or other prioritization of such elements or priorities. While various exemplary embodiments of the disclosed systems and methods have been described below, it should be understood that they have been presented for purposes of example only, and not limitations. It is not exhaustive and does not limit the present invention to the precise form disclosed. Modifications and variations are possible in light of the below teachings or may be acquired from practicing of the present invention, without departing from the breadth or scope.

The apparatus of the present invention will now be described with reference to the accompanying drawings, which should be regarded as merely illustrative without restricting the scope and ambit of the present invention. Embodiments of the present invention will now be described with reference to FIGS. 1-18.

Figure 1A:
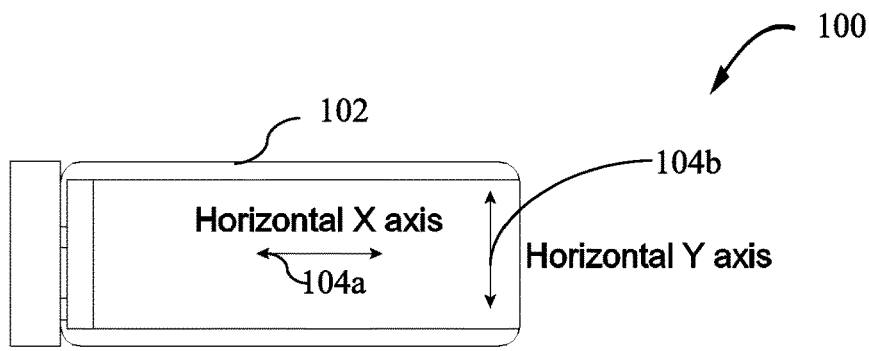
FIG. 1A is a diagram that illustrates a top view of a furniture such as a bed with built-in joyride showing directions of two horizontal motions, according to an exemplary embodiment of the present invention.

FIG. 1A is a diagram that illustrates a top view 100 of a bed 102 with built-in joyride showing directions of two horizontal motions, according to an exemplary embodiment of the present invention. The two horizontal motions are along a horizontal X axis 104a and a horizontal Y axis 104b. As shown, the bed 102 is configured to move in two horizontal directions such as the horizontal X axis 104a and the horizontal Y axis 104b. In an embodiment, the bed 102 with a ride (hereinafter, may be referred to as the BWAR 102) consists of one or more mechanical linear actuators. The linear actuators are controlled by a BWAR computer. The linear actuators may be either electrical or hydraulic or pneumatic actuators or any combination thereof. The BWAR computer may be a computing device and may include suitable logic, circuitry, interfaces, and/or code, executable by the circuitry, that may be configured to perform one or more operations. For example, the BWAR computer runs a program that a user can select. This program has the information on position, direction, speed, and movement. The BWAR computer also controls illumination and fan speed of one or more types of fans connected to the bed 102. The BWAR computer may be realized through various web-based technologies, such as, but are not limited to, a Java web-framework, a .NET framework, a professional hypertext preprocessor (PHP) framework, a python framework, or any other web-application framework. The BWAR computer may also be realized as a machine-learning model that implements any suitable machine-learning techniques, statistical techniques, or probabilistic techniques. Examples of such techniques may include expert systems, fuzzy logic, support vector machines (SVM), Hidden Markov models (HMMs), greedy search algorithms, rule-based systems, Bayesian models (e.g., Bayesian networks), neural networks, decision tree learning methods, other non-linear training techniques, data fusion, utility-based analytical systems, or the like. Examples of the BWAR computer may include, but are not limited to, a built-in dedicated computer, a personal computer, a laptop, or a network of computer systems.

In an embodiment, the user could choose a ride using an application running on a user device such as a cell phone or a tablet computer. This cell phone or tablet computer may communicate with the BWAR computer to provide it the program or executing instructions for the ride. Once selected, the ride starts, and the user can enjoy the ride. The expectation is that experts will synchronize illumination, ride position, speed, direction and optional fan speeds with pieces of music or entertainment. In some embodiments, the users strap themselves to the bed 102 and then choose a ride that will then start and will cause the movement of the bed 102 along at least the horizontal X axis 104a and the horizontal Y axis 104b. The BWAR computer may then run the ride including the illumination and the fans according to this program. By making virtual reality equipment interface with the BWAR, unique user experiences may be created.

Figure 1B:
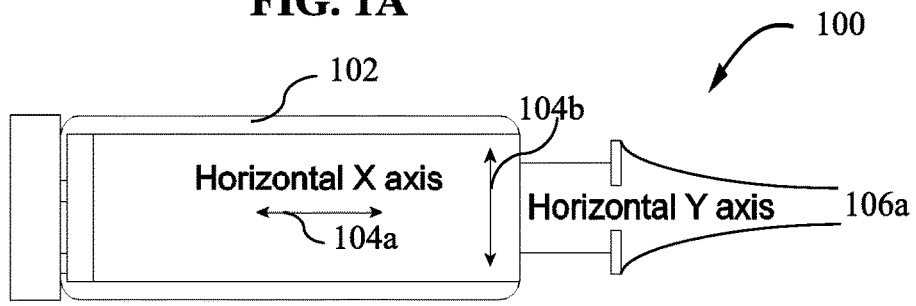
FIG. 1B is a diagram that illustrates a top view of the bed with built-in joyride showing directions of two horizontal motions with optional fans in a first position, according to an exemplary embodiment of the present invention.

FIG. 1B is a diagram that illustrates a top view 100 of the bed 102 with built-in joyride showing directions of two horizontal motions 104a and 104b with optional fans 106a in a first position, according to an exemplary embodiment of the present invention. The optional fans 106a may be removably attached to the first position of the bed 102. In an exemplary embodiment, the first position may be located towards a leg side of the bed 102. The user may control ON-OFF of the optional fans 106a by means of the user device. For example, the user, by means of a user application running on the user device, may select an option to turn ON the optional fans 106a. Based on the selection, the user device may communicate a turn ON signal to the BWAR computer (installed in the bed 102) over a communication network. The BWAR computer may receive the turn ON signal from the user device. Thereafter, the BWAR computer may turn ON the optional fans 106a. Examples of types of the communication network may include, but are not limited to, a local area network, a wide area network, a radio network, a virtual private network, an internet area network, a metropolitan area network, a satellite network, Wi-Fi, Bluetooth Low energy, a wireless network, and a telecommunication network. Examples of the telecommunication network may include, but are not be limited to, a global system for mobile communication (GSM) network, a general packet radio service (GPRS) network, third Generation Partnership Project (3GPP), an enhanced data GSM environment (EDGE), and a Universal Mobile Telecommunications System (UMTS).

Similarly, the user may control ON-OFF of the horizontal motions 104a and 104b by means of the user device. For example, the user, by means of the user application running on the user device, may select an option to turn ON at least one of the horizontal motions 104a and 104b. Based on the selection, the user device may communicate a motion ON signal to the BWAR computer (installed in the bed 102) over the communication network. The BWAR computer may receive the motion ON signal from the user device. Thereafter, the BWAR computer may turn ON at least one of the horizontal motions 104a and 104b. In some embodiments, the user may turn ON both of the optional fans 106a and the horizontal motions 104a and 104b to experience the joyride while relaxing on the bed 102.

Figure 1C:
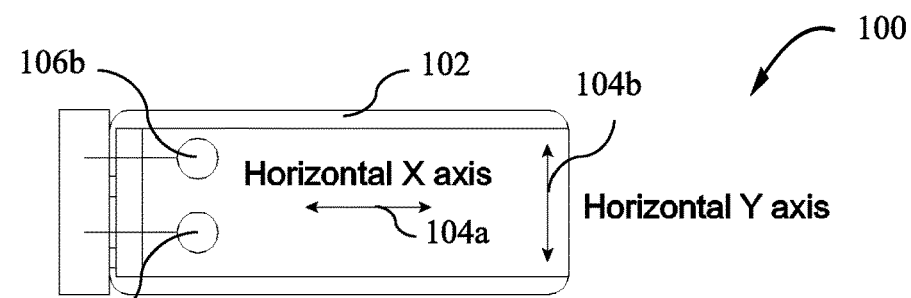
FIG. 1C is a diagram that illustrates a top view of the bed with built-in Joyride showing directions of two horizontal motions with optional rotary fans in a second position over the bed, according to an exemplary embodiment of the present invention.

FIG. 1C is a diagram that illustrates a top view 100 of the bed 102 with built-in joyride showing directions of two horizontal motions 104a and 104b with optional rotary fans 106b in a second position over the bed 102, according to an exemplary embodiment of the present invention. The optional rotary fans 106b may be removably attached to the second position of the bed 102. In an exemplary embodiment, the second position may be located towards a head side of the bed 102. The user may control ON-OFF of the optional rotary fans 106b by means of the user device. For example, the user, by means of the user application running on the user device, may select an option to turn ON the optional rotary fans 106b. Based on the selection, the user device may communicate a turn ON signal to the BWAR computer (installed in the bed 102) over the communication network. The BWAR computer may receive the turn ON signal from the user device. Thereafter, the BWAR computer may turn ON the optional rotary fans 106b. Similarly, the user may control ON-OFF of the horizontal motions 104a and 104b by means of the user device. For example, the user, by means of the user application running on the user device, may select an option to turn ON at least one of the horizontal motions 104a and 104b. Based on the selection, the user device may communicate a motion ON signal to the BWAR computer (installed in the bed 102) over the communication network. The BWAR computer may receive the motion ON signal from the user device. Thereafter, the BWAR computer may turn ON at least one of the horizontal motions 104a and 104b. In some embodiments, the user may turn ON both of the optional rotary fans 106b and the horizontal motions 104a and 104b to experience the joyride while relaxing on the bed 102.

Figure 1D:
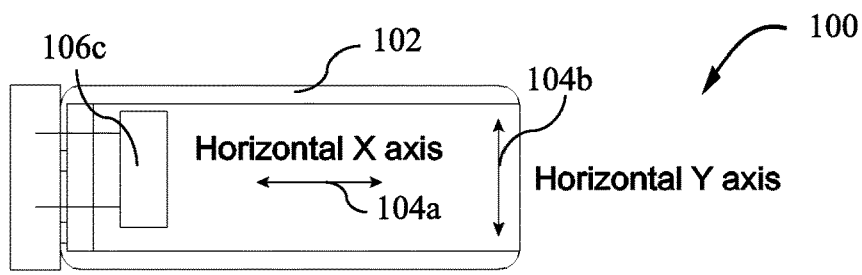
FIG. 1D is a diagram that illustrates a top view of the bed with built-in joyride showing directions of two horizontal motions with optional linear fans in the second position over the bed, according to an exemplary embodiment of the present invention.

FIG. 1D is a diagram that illustrates a top view 100 of the bed 102 with built-in joyride showing directions of two horizontal motions 104a and 104b with optional linear fans 106c in the second position over the bed 102, according to an exemplary embodiment of the present invention. The optional linear fans 106c may be removably attached to the second position of the bed 102. In an exemplary embodiment, the second position may be located towards a head side of the bed 102. The user may control ON-OFF of the optional linear fans 106c by means of the user device. For example, the user, by means of the user application running on the user device, may select an option to turn ON the optional linear fans 106c. Based on the selection, the user device may communicate a turn ON signal to the BWAR computer (installed in the bed 102) over the communication network. The BWAR computer may receive the turn ON signal from the user device. Thereafter, the BWAR computer may turn ON the optional linear fans 106c. Similarly, the user may control ON-OFF of the horizontal motions 104a and 104b by means of the user device. For example, the user, by means of the user application running on the user device, may select an option to turn ON at least one of the horizontal motions 104a and 104b. Based on the selection, the user device may communicate a motion ON signal to the BWAR computer (installed in the bed 102) over the communication network. The BWAR computer may receive the motion ON signal from the user device. Thereafter, the BWAR computer may turn ON at least one of the horizontal motions 104*a* and 104*b*. In some embodiments, the user may turn ON both of the optional linear fans 106*c* and the horizontal motions 104*a* and 104*b* to experience the joyride while relaxing on the bed 102.

Figure 1E:
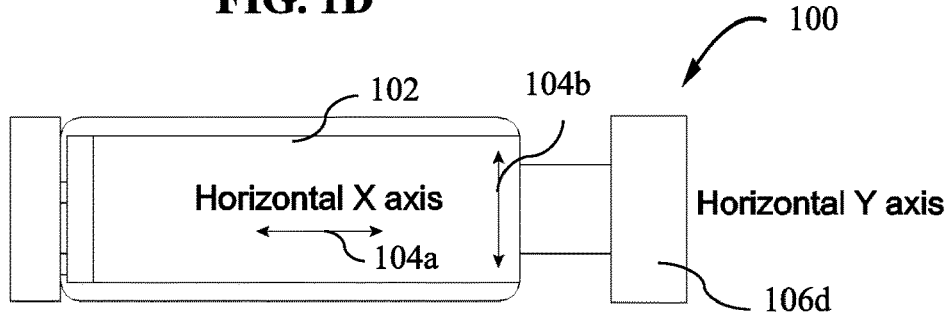
FIG. 1E is a diagram that illustrates a top view of the bed with built-in joyride showing directions of two horizontal motions with optional linear fans in the first position, according to an exemplary embodiment of the present invention.

FIG. 1E is a diagram that illustrates a top view 100 of the bed 102 with built-in joyride showing directions of two horizontal motions 104*a* and 104*b* with optional linear fans 106*d* in the first position, according to an exemplary embodiment of the present invention. The optional linear fans 106*d* may be removably attached to the first position of the bed 102. In an exemplary embodiment, the first position may be located towards a leg side of the bed 102. The user may control ON-OFF of the optional linear fans 106*d* by means of the user device. For example, the user, by means of the user application running on the user device, may select an option to turn ON the optional linear fans 106*d*. Based on the selection, the user device may communicate a turn ON signal to the BWAR computer (installed in the bed 102) over the communication network. The BWAR computer may receive the turn ON signal from the user device. Thereafter, the BWAR computer may turn ON the optional linear fans 106*d*. Similarly, the user may control ON-OFF of the horizontal motions 104*a* and 104*b* by means of the user device. For example, the user, by means of the user application running on the user device, may select an option to turn ON at least one of the horizontal motions 104*a* and 104*b*. Based on the selection, the user device may communicate a motion ON signal to the BWAR computer (installed in the bed 102) over the communication network. The BWAR computer may receive the motion ON signal from the user device. Thereafter, the BWAR computer may turn ON at least one of the horizontal motions 104*a* and 104*b*. In some embodiments, the user may turn ON both of the optional linear fans 106*d* and the horizontal motions 104*a* and 104*b* to experience the joyride while relaxing on the bed 102.

FIGS. 1A-1E show the top view 100 of the BWAR (i.e., the bed 102) in a rectangular form factor. The figures also show a few ways linear or rotary fans can be attached to the BWAR. The computer built-in the BWAR controls the movements, illumination and fan speeds to create the user experience during the joyride. The figures show that the linear actuators can create horizontal x and y dimensional movements of the bed 102.

Figure 2A:
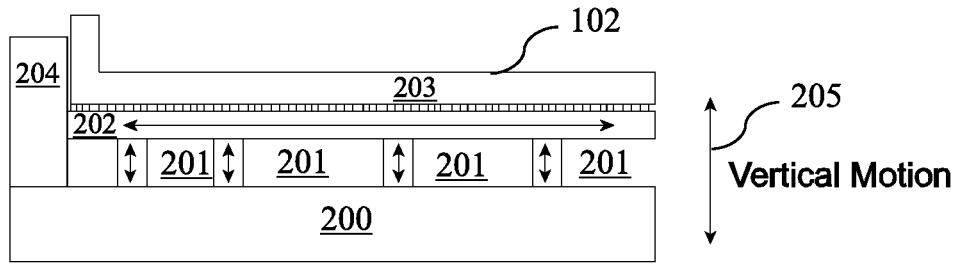
FIG. 2A is a diagram that illustrates a side view of the bed showing a vertical motion without the optional fans showing a vertical position that is somewhat open, according to an exemplary embodiment of the present invention.
Figure 5:
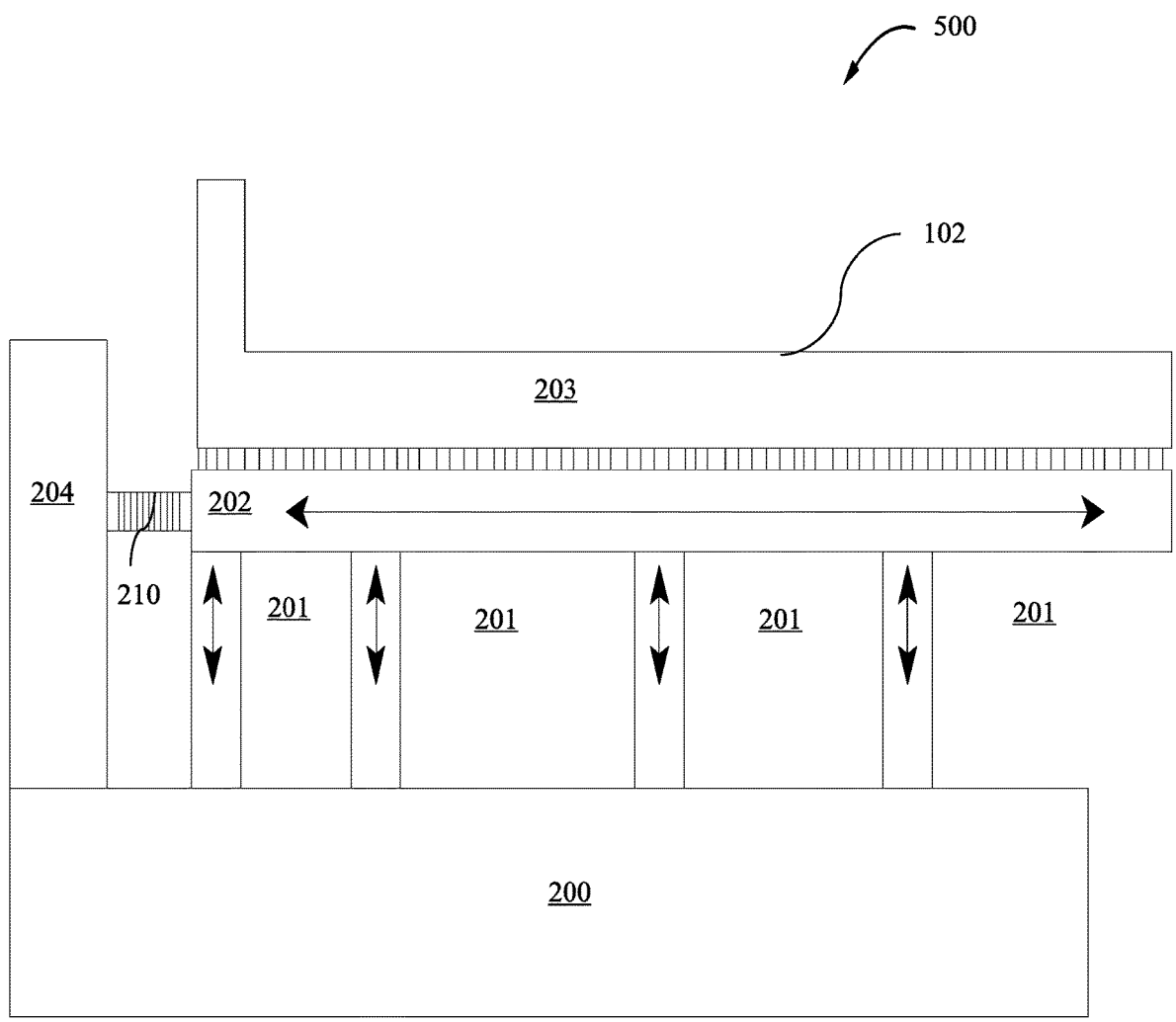
FIG. 5 is a diagram that illustrates a side view of the bed showing the vertical motion without the optional fans showing the vertical position that is quite open and horizontal X position quite open, according to an exemplary embodiment of the present invention.
Figure 6:
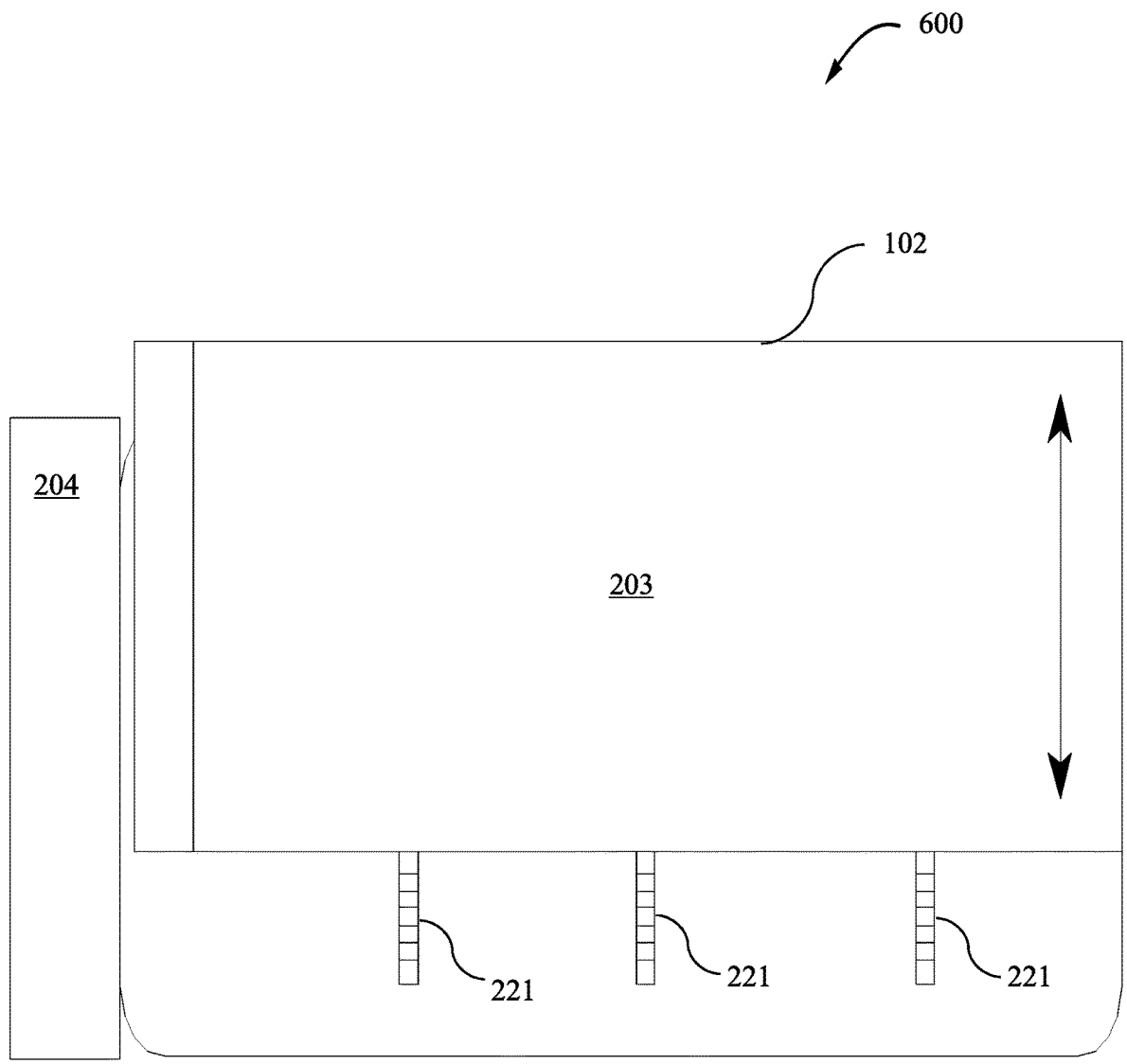
FIG. 6 is a diagram that illustrates a top view of the bed without the optional fans with horizontal Y position in one extreme, according to an exemplary embodiment of the present invention.

FIG. 2A is a diagram that illustrates a side view of the bed 102 showing a vertical motion 205 without the optional fans showing a vertical position that is somewhat open, according to an exemplary embodiment of the present invention. FIG. 2A shows the side view of the bed 102. A component 200 is a base associated with the bed 102. Components 201 are the linear actuators used for producing the vertical movement 205. A component 204 is a head structure part of the bed 102 that is an important part of the bed 102. A component 202 is a surface that rests on top of the linear actuators 201. Also, the component 202 moves in the horizontal X direction pushed by a set of linear actuators (210 in FIG. 5). These linear actuators are mounted inside the head structure part 204 but they move in sync with the linear actuators 201. A component 203 is a horizontal board that sits on top of the component 202 and it moves on top of the component 202 based on the linear actuators (210 in FIG. 5) that are attached to the component 202. Even though the drawings show all linear actuators 201 being open or closed at the same time with the same height, this is also something that the BWAR computer controls individually for each linear actuator. By individually controlling each linear actuator, the BWAR computer can tilt the bed 102 as part of the ride. The connections of the linear actuators 201 to the surface 202 needs to be done with hinges to allow this freedom of movement. The linear actuators 210 in FIG. 5 are also individually controlled by the BWAR computer. Similarly, the linear actuators 221 in FIG. 6 are also individually controlled by the BWAR computer. This allows for providing various tilts as part of the ride.

Figure 2B:
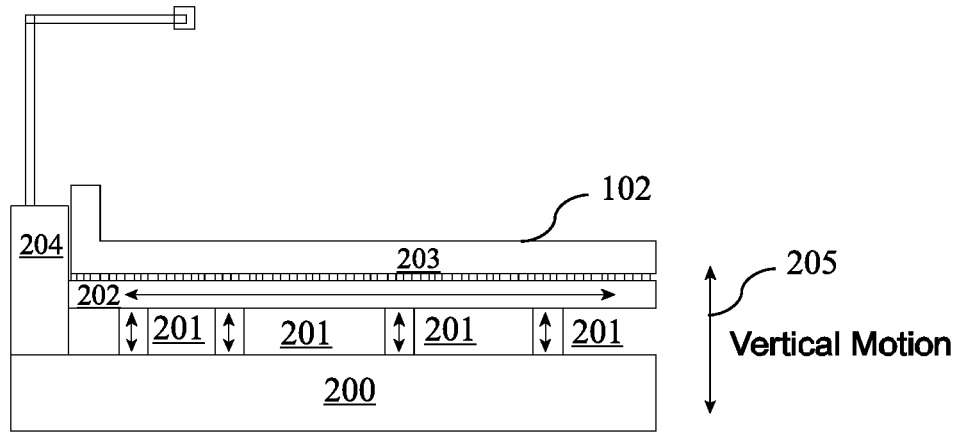
FIG. 2B is a diagram that illustrates a side view of the bed showing the vertical motion with the optional fans over the bed in the second position, according to an exemplary embodiment of the present invention.
Figure 2C:
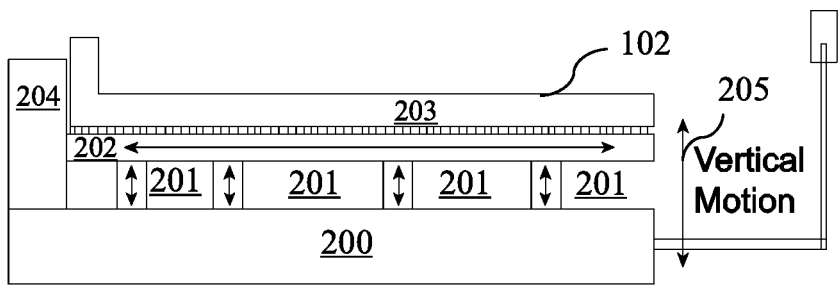
FIG. 2C is a diagram that illustrates a side view of the bed showing the vertical motion with the optional fans in the first position, according to an exemplary embodiment of the present invention.

FIG. 2B is a diagram that illustrates a side view of the bed 102 showing the vertical motion 205 with the optional fans 106*b* or 106*c* over the bed 102 in the second position, according to an exemplary embodiment of the present invention. The optional fans 106*b* or 106*c* may be removably attached to the second position i.e., the head structure part 204 of the bed 102. FIG. 2C is a diagram that illustrates a side view of the bed 102 showing the vertical motion with the optional fans 106*a* or 106*d* in the first position, according to an exemplary embodiment of the present invention. The optional fans 106*a* or 106*d* may be removably attached to the first position i.e., the base part 200 of the bed 102. Along with controlling each linear actuator for facilitating the desired movement along at least one of the horizontal X axis 104*a*, the horizontal Y axis 104*b*, and the vertical axis 205, the BWAR computer also controls ON-OFF operation of each of the optional fans 106*a*, 106*b*, 106*c*, and 106*d*. The ON-OFF operation of each of the optional fans 106*a*, 106*b*, 106*c*, and 106*d* may be controlled based on the user's preferences provided by the user by means of the user application running on the user device. Alternatively, the ON-OFF operation of each of the optional fans 106*a*, 106*b*, 106*c*, and 106*d* may be controlled based on the user's preferences provided by the user by means of the BWAR computer. Further, the linear actuators may be operated in a controlled manner to facilitate rotary motion and 3D Stewart type of movements, either individually or in combination with the movements along at least one of the horizontal X axis 104*a*, the horizontal Y axis 104*b*, and the vertical axis 205.

Figure 3:
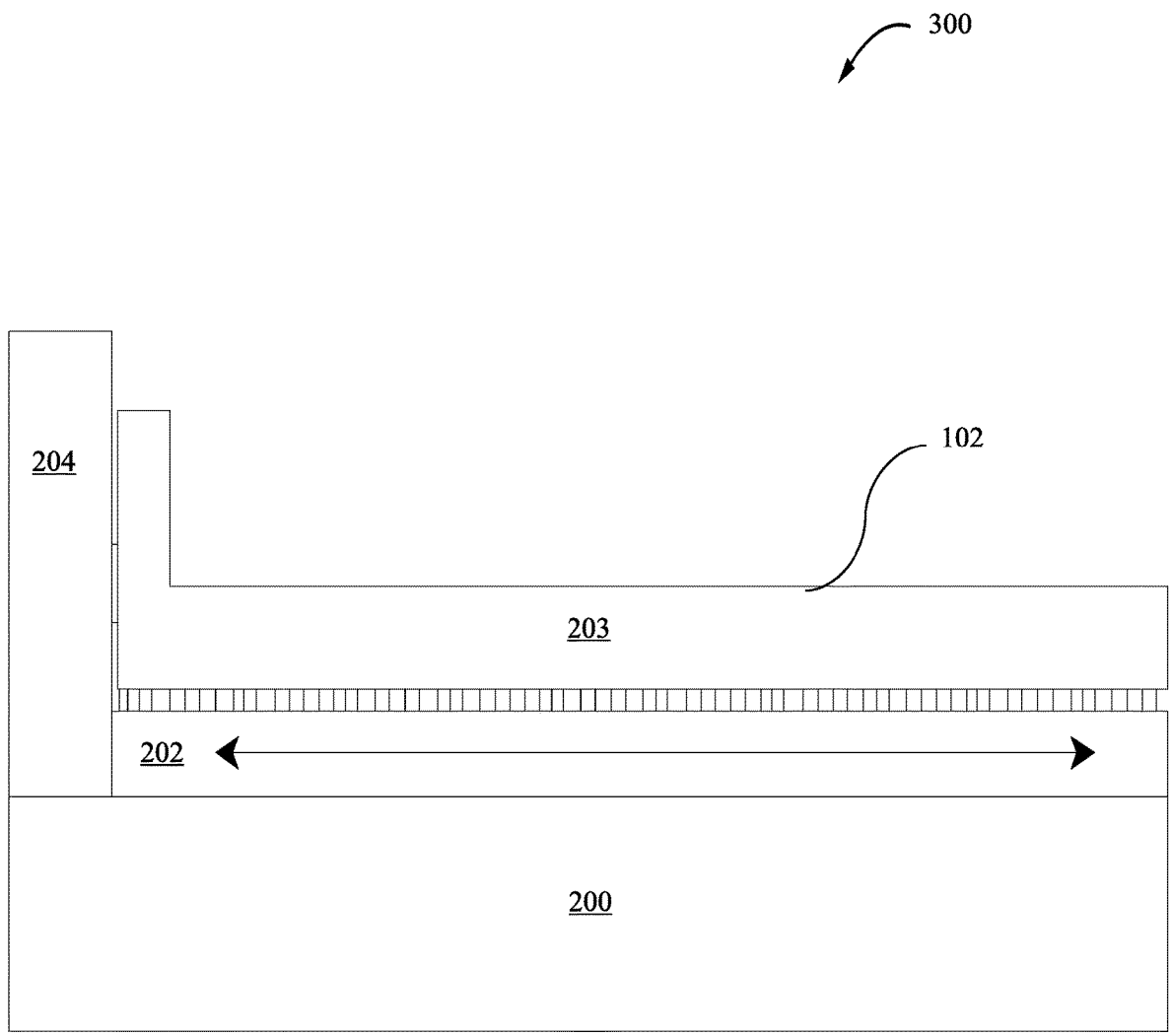
FIG. 3 is a diagram that illustrates a side view of the bed showing the vertical motion without the optional fans showing the vertical position that is closed, according to an exemplary embodiment of the present invention.

FIG. 3 is a diagram that illustrates a side view 300 of the bed 102 showing the vertical motion 205 without the optional fans showing the vertical position that is closed, according to an exemplary embodiment of the present invention. FIG. 3 shows the side view of the bed 102. The component 200 is the base associated with the bed 102. The component 204 is the head structure part of the bed 102. The component 202 is the surface that rests on top of the linear actuators 201 (shown in FIGS. 2A-2C). Also, the component 202 moves in the horizontal X direction pushed by the set of linear actuators (210 in FIG. 5). These linear actuators are mounted inside the head structure part 204 but they move in sync with the linear actuators 201. The component 203 is the horizontal board that sits on top of the component 202 and it moves on top of the component 202 based on the linear actuators (210 in FIG. 5) that are attached to the component 202. Here, FIG. 3 illustrates the side view 300 of the bed 102 with linear actuators 201 closed.

Figure 4:
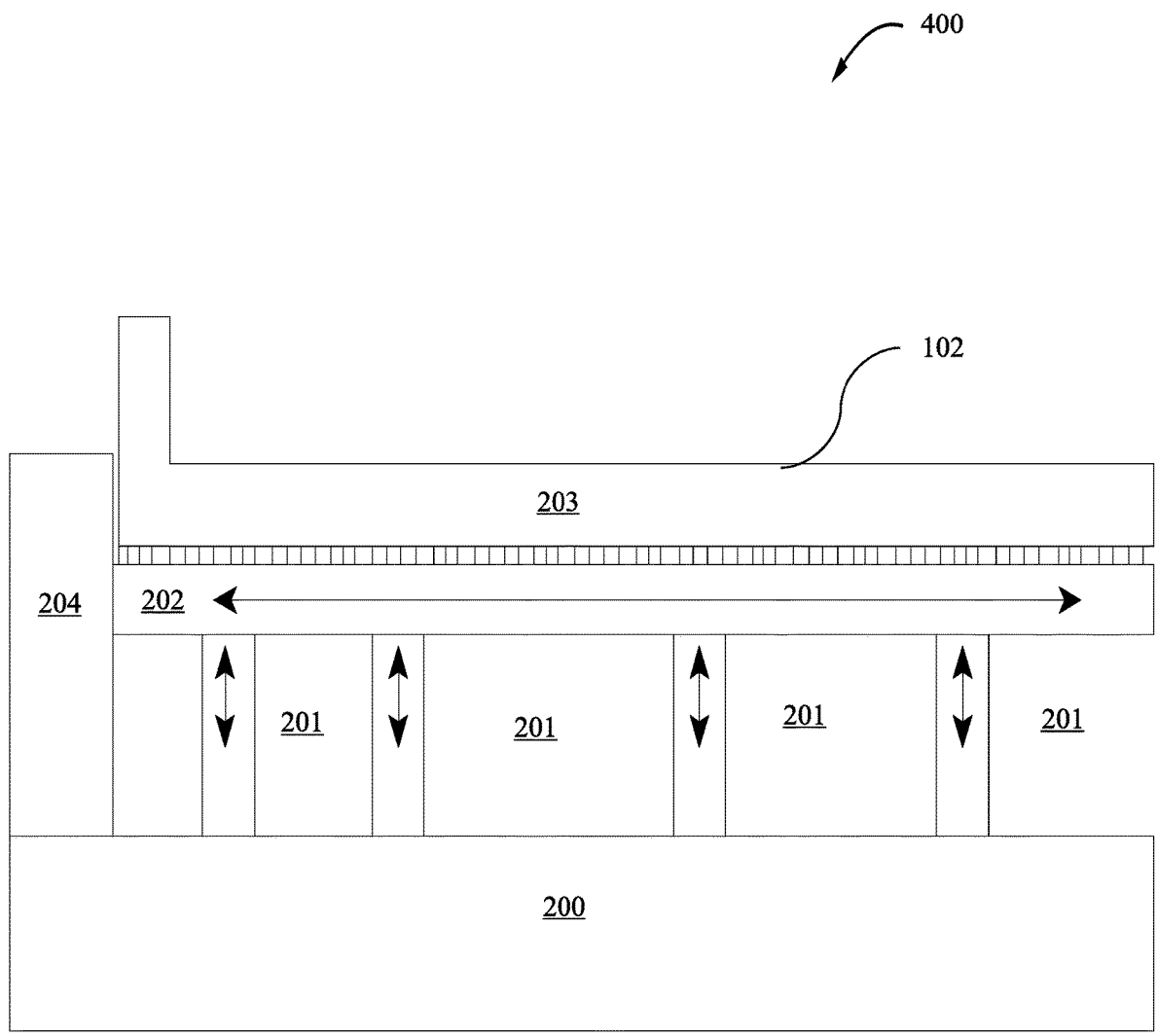
FIG. 4 is a diagram that illustrates a side view of the bed showing the vertical motion without the optional fans showing the vertical position that is quite open, according to an exemplary embodiment of the present invention.

FIG. 4 is a diagram that illustrates a side view 400 of the bed 102 showing the vertical motion 205 without the optional fans showing the vertical position that is quite open, according to an exemplary embodiment of the present invention. FIG. 4 shows the side view of the bed 102. The component 200 is the base associated with the bed 102. The component 204 is the head structure part of the bed 102. The component 202 is the surface that rests on top of the linear actuators 201. Also, the component 202 moves in the horizontal X direction pushed by the set of linear actuators (210 in FIG. 5). These linear actuators are mounted inside the head structure part 204 but they move in sync with the linear actuators 201. The component 203 is the horizontal board that sits on top of the component 202 and it moves on top of the component 202 based on the linear actuators (210 in FIG. 5) that are attached to the component 202. Here, FIG. 4 illustrates the linear actuators 201 fully extended in the vertical side.

FIG. 5 is a diagram that illustrates a side view 500 of the bed 102 showing the vertical motion 205 without the optional fans showing the vertical position that is quite open and the horizontal X position quite open, according to an exemplary embodiment of the present invention. FIG. 5 shows the side view of the bed 102. The component 200 is the base associated with the bed 102. The component 204 is the head structure part of the bed 102. The component 202 is the surface that rests on top of the linear actuators 201. Also, the component 202 moves in the horizontal X direction pushed by the set of linear actuators 210. These linear actuators 210 are mounted inside the head structure part 204 but they move in sync with the linear actuators 201. The component 203 is the horizontal board that sits on top of the component 202 and it moves on top of the component 202 based on the linear actuators 210 that are attached to the component 202. Here, FIG. 5 illustrates the side view 500 with the vertical linear actuators 201 extended as well as the horizontal linear actuators 210 extended. In some embodiments, the vertical linear actuators 201 and the horizontal linear actuators 210 may be operated for providing various tilts as part of the ride. The linear actuators 210 may be individually controlled by the BWAR computer. Similarly, the linear actuators 201 may also be individually controlled by the BWAR computer. This allows for providing various tilts as part of the ride.

FIG. 6 is a diagram that illustrates a top view 600 of the bed 102 without the optional fans with horizontal Y position in one extreme, according to an exemplary embodiment of the present invention. FIG. 6 shows the top view 600 of the bed 102. The component 204 is the head structure part of the bed 102. The component 203 is the horizontal board that sits on top of the component 202. By individually controlling each linear actuator, the BWAR computer can tilt the bed 102 as part of the ride. The connections of the linear actuators 201 to the surface 202 needs to be done with hinges to allow this freedom of movement. The linear actuators 210 in FIG. 5 are also individually controlled by the BWAR computer. Similarly, the linear actuators 221 are also individually controlled by the BWAR computer. This allows for providing various tilts as part of the ride. FIG. 6 shows the top view 600 of the BWAR with the horizontal linear actuators 221 extended in the maximum Y position.

Figure 7:
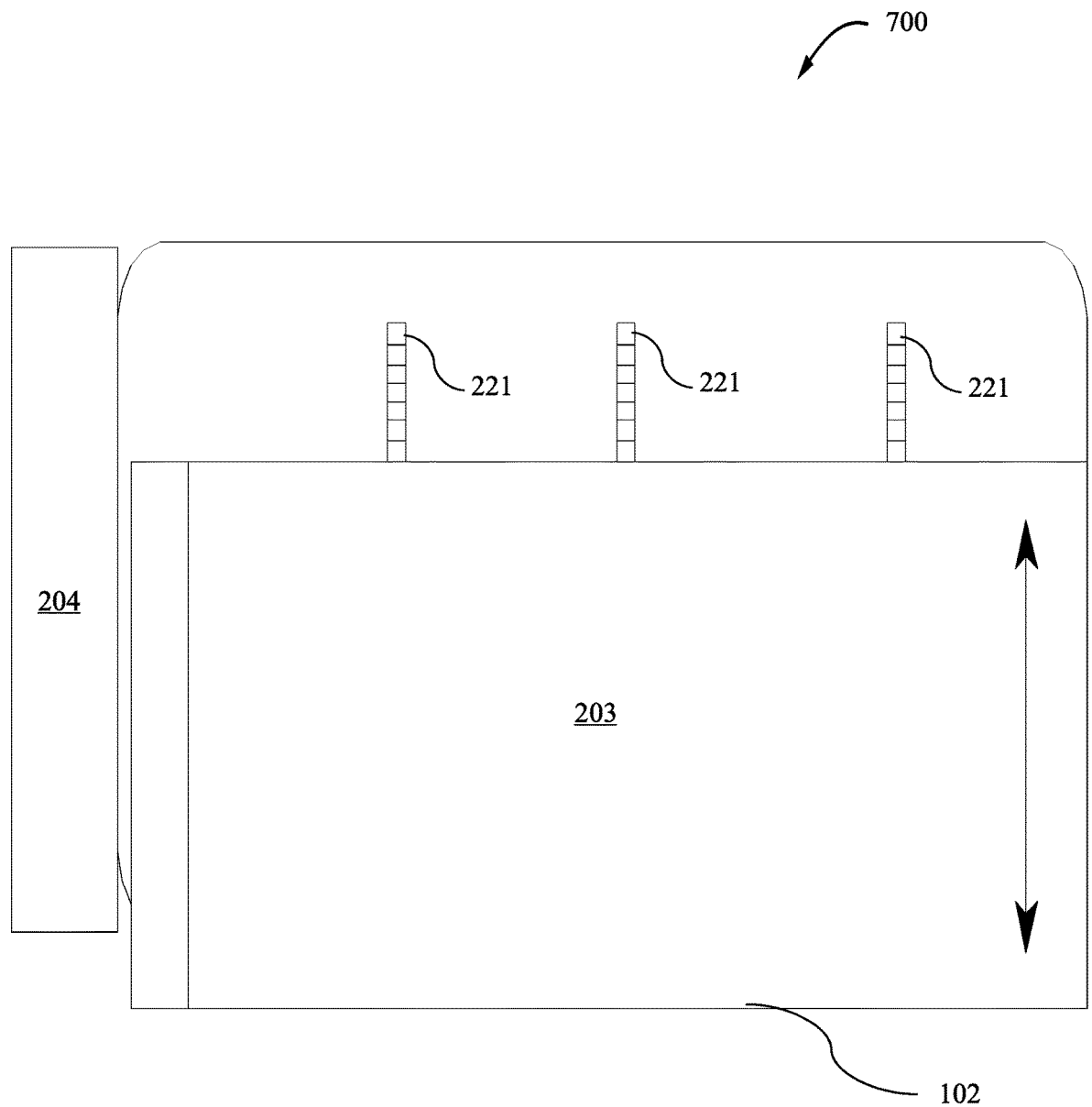
FIG. 7 is a diagram that illustrates a top view of the bed without the optional fans with the horizontal Y position in another extreme, according to an exemplary embodiment of the present invention.

FIG. 7 is a diagram that illustrates a top view 700 of the bed 102 without the optional fans with the horizontal Y position in another extreme, according to an exemplary embodiment of the present invention. FIG. 7 shows the top view 700 of the BWAR with horizontal linear actuators 221 extended in the minimum Y position. FIG. 7 shows the top view 600 of the bed 102. The component 204 is the head structure part of the bed 102. The component 203 is the horizontal board that sits on top of the component 202. By individually controlling each linear actuator, the BWAR computer can tilt the bed 102 as part of the ride. The connections of the linear actuators 201 to the surface 202 needs to be done with hinges to allow this freedom of movement. The linear actuators 210 in FIG. 5 are also individually controlled by the BWAR computer. Similarly, the linear actuators 221 are also individually controlled by the BWAR computer. This allows for providing various tilts as part of the ride.

Figure 8:
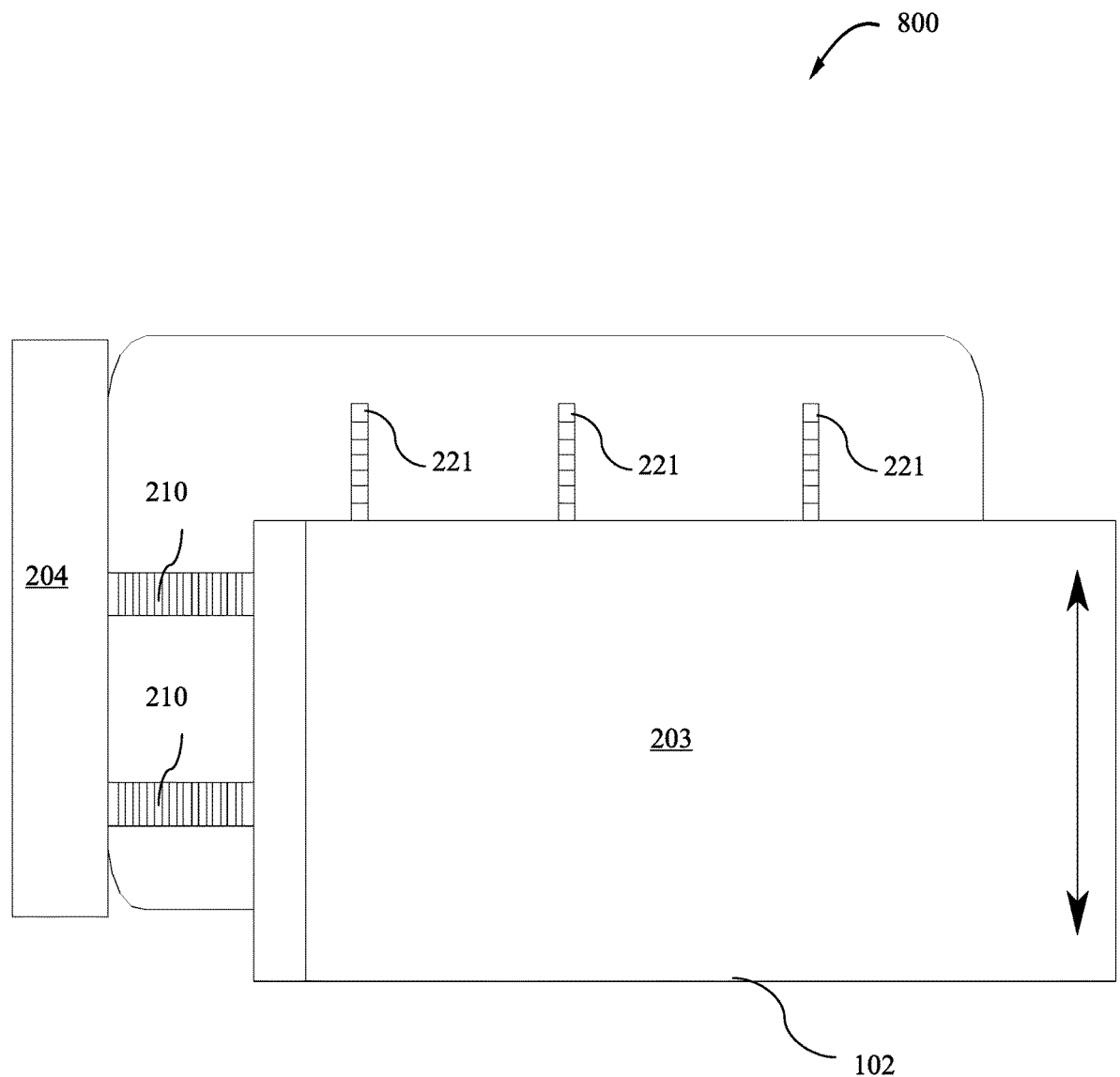
FIG. 8 is a diagram that illustrates a top view of the bed without the optional fans with the horizontal minimum Y position and maximum X position, according to an exemplary embodiment of the present invention.

FIG. 8 is a diagram that illustrates a top view 800 of the bed 102 without the optional fans with the horizontal minimum Y position and maximum X position, according to an exemplary embodiment of the present invention. FIG. 8 shows the top view 800 of the BWAR with the horizontal minimum Y position and maximum X position. FIG. 8 shows the top view 800 of the bed 102. The component 204 is the head structure part of the bed 102. The linear actuators 210 are mounted inside the head structure part 204. The component 203 is the horizontal board that sits on top of the component 202. By individually controlling each linear actuator, the BWAR computer can tilt the bed 102 as part of the ride. The connections of the linear actuators 201 to the surface 202 needs to be done with hinges to allow this freedom of movement. The linear actuators 210 in FIG. 5 are also individually controlled by the BWAR computer. Similarly, the linear actuators 221 are also individually controlled by the BWAR computer. This allows for providing various tilts as part of the ride.

Figure 9A:
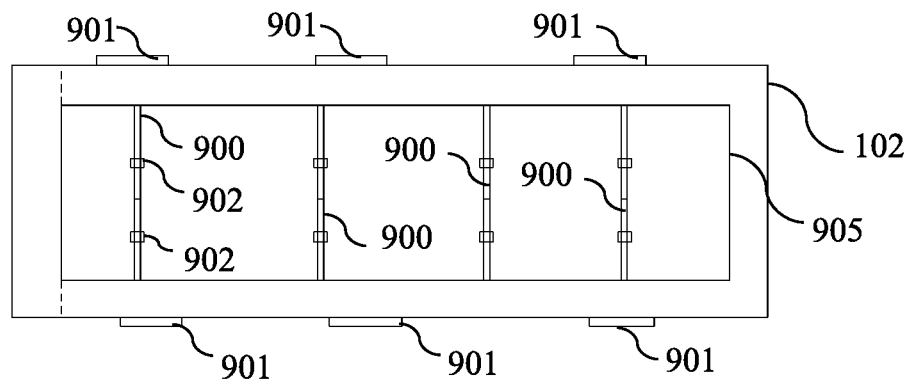
FIG. 9A is a diagram that illustrates a top view of mattress showing internal straps to strap users as well as external notches to strap mattress to the bed, according to an exemplary embodiment of the present invention.

FIG. 9A is a diagram that illustrates a top view of mattress 905 showing internal straps 900 to strap users as well as external pockets or notches 901 to strap mattress 905 to the bed 102, according to an exemplary embodiment of the present invention. The straps 900 are used for strapping the user on mattress 905 of the bed 102. The notches 901 are used for strapping the mattress 905 to the bed 102. By means of the straps 900, the movement of the user on the bed 102 is static when the bed 102 is moving in at least one of the horizontal X axis, the horizontal Y axis, or the vertical axis. Also, by strapping the mattress 905 using the notches 901, the mattress 905 does not slip over the bed 102 when the bed 102 is moving in at least one of the horizontal X axis, the horizontal Y axis, or the vertical axis.

Figure 9B:
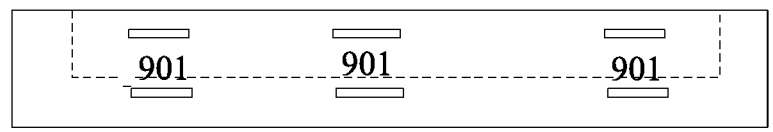
FIG. 9B is a diagram that illustrates a side view of the mattress showing external notches to strap mattress to the bed, according to an exemplary embodiment of the present invention.

FIG. 9B is a diagram that illustrates a side view of the mattress 905 showing the external notches 901 to strap mattress 905 to the bed 102, according to an exemplary embodiment of the present invention. By strapping the mattress 905 using the notches 901, the mattress 905 does not slip over the bed 102 when the bed 102 is moving in at least one of the horizontal X axis, the horizontal Y axis, or the vertical axis. It also shows the raised sides of the mattress 905 which is an optional part of the mattress 905 to provide comfort and safety in the ride mode.

Figure 9C:
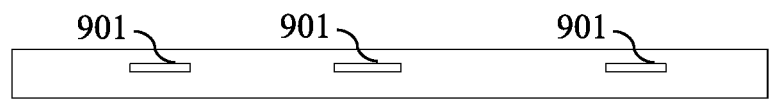
FIG. 9C is a diagram that illustrates a side view of the mattress without the optional safety parts attached, according to an exemplary embodiment of the present invention.
Figure 9D:
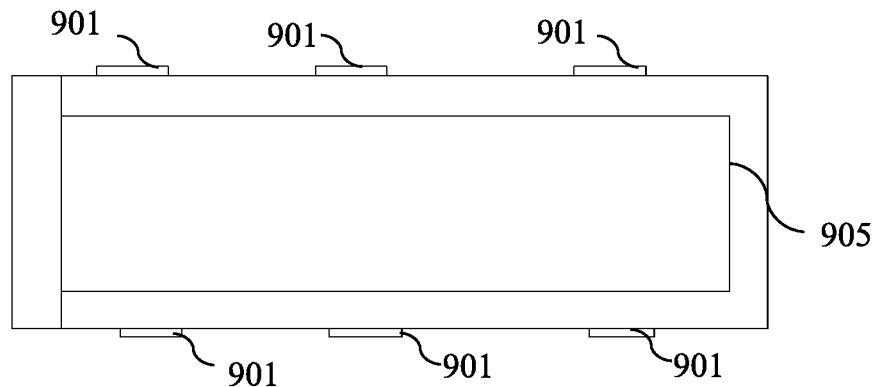
FIG. 9D is a diagram that illustrates the optional safety siding of the mattress that attaches to the mattress to provide comfort and additional safety during a ride, according to an exemplary embodiment of the present invention.

FIG. 9C is a diagram that illustrates a side view of the mattress 905 without the optional safety parts attached, according to an exemplary embodiment of the present invention. FIG. 9D is a diagram that illustrates the optional safety siding of the mattress 905 that attaches to the mattress 905 to provide comfort and additional safety during the ride, according to an exemplary embodiment of the present invention.

In an embodiment, the user can strap himself or herself on the mattress 905 using the straps 900. Then, the user may utilize the user device (or the BWAR computer) to select a piece of music or entertainment and the associated program to play on the user device (such as a cell phone or tablet computer) or on an optional display screen of the BWAR computer. There may be some prepackaged movements that the user could select. In some other embodiments, the user may go electronically to a digital store to download from a library of approved programs to play on the BWAR computer or the user device. Some of these experiences may be curated by experts to synchronize with certain music or entertainment. Once the user selects the experience, the cell phone or tablet computer or the optional screen communicates to the BWAR computer. The BWAR computer then moves the linear actuators in the bed 102. The BWAR computer may also control the lights to give the user a ride experience. The lights may be integrated with the bed 102. For example, the lights may be provided along the sides of the bed 102. The BWAR computer may also the fans (such as the fans 106a-106d) to give the user a ride experience.

In an embodiment, the BWAR may be configured to facilitate 3 different axis of motions (such as the horizontal X axis, the horizontal Y axis, or the vertical axis). Further, the BWAR may be configured to facilitate illumination control of the lights as well as fan speed control of the fans. The illumination control and fan speed control may be executed by providing appropriate inputs using the user device or the BWAR computer. It is possible that the user might need only one of these functionalities and the BWAR might only have one of these functionalities. For example, it might be a bed supporting only linear X axis motion using electrical, hydraulic or pneumatic actuators controlled by the BWAR computer. There is a special mattress 905 that is used with the BWAR. This is to make sure the users are safe in the BWAR when they are using the ride mode. The mattress 905 has connectors 902 through which the straps 900 strap the mattress 905 to the BWAR. Also, there is an attachment that goes around the mattress 905 to provide extra comfort and safety during the ride. The attachment attaches to the mattress 905 using a zip or Velcro like material.

The present invention discloses the apparatus for applying the three-dimensional motion including the vertical and horizontal motion to a furniture such as the bed 102. The apparatus includes a mechanical frame with the linear actuators 201, 210, and 221 that are controlled by the BWAR computer. The supported motion may be along the horizontal X axis, the horizontal Y axis, the vertical motion, or any combination thereof as described above. In addition to the vertical and horizontal motion, the apparatus may also facilitate rotary motion and 3D Stewart type of movements. The linear actuators 201, 210, and 221 may correspond to electrical linear actuators, hydraulic actuators, pneumatic linear actuators, or any combination thereof. The apparatus can optionally control the illumination of lights and speeds of multiple fans (such as the fans 106a-106d) to provide the joyride experience to the user of the bed 102. The BWAR computer that controls the movements of the bed 102, illumination of the lights, and speeds of the fans may be programmed remotely by an application running on the user device such as a cellular device or another tablet, laptop or another computer. The movements of the bed 102, illumination of the lights, the speeds of the fans may also be programmed by a remote device using an easy to use interface. Experts in a field of synchronizing the music to the movements can create files to capture the movements, illumination, fan speeds information with respect to a piece of music, entertainment, or the like. These files with synchronized information may be hosted on remote servers. These files may also be remotely downloaded to the BWAR computer that controls the movements of the bed 102, illumination of the lights, speeds of the furniture fans, or the music. This can provide the user a unique experience with entertainment synchronized with movements, illumination as well as effect of fans. The apparatus may be created and used with a subset of features such as only horizontal movement in one or more directions without any other movement. Thus, by way of the BWAR disclosed in the present invention, the BWAR facilitates a way of enjoying music or other entertainment with the addition of movement and illumination in the privacy of a personal space. The user can enjoy exciting and relaxing movements within the privacy of a personal space. The user can use the personal room space more efficiently by also including the joyride (by installing the BWAR) in the same space. Such experiences can also be included by any hospitality business without significant new expenses of creating the joyride. Any user can add an active distraction in the private space by using the effect of synchronized music, movement and illumination by installing the BWAR disclosed in the present invention. A private experience of movement, illumination and music to be enjoyed with significant others in a private space without crowds. An enhanced virtual reality experience when special content can be created tailored to the bed 102 with the ride.

The above embodiments of the joyride have been described with respect to one specific furniture such as the bed 102. However, a person having ordinary skill in the art would understand that the above embodiments are not limited to the bed 102 only. The above embodiments may be implanted using various other types of furniture such as chairs, sofas, or the like. FIGS. 10-18 describe the chair embodiments of the present invention.

Figure 10A:
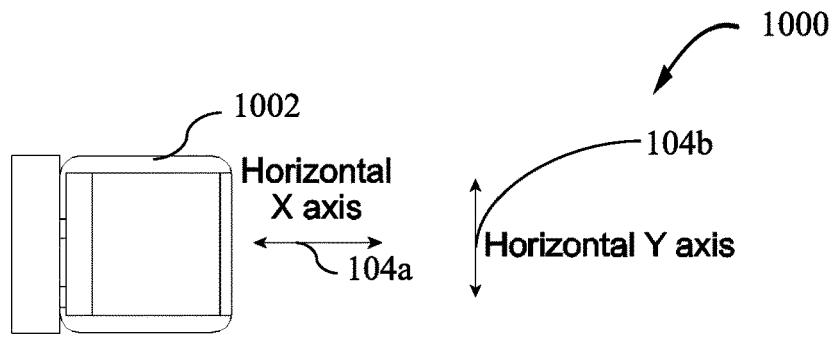
FIG. 10A is a diagram that illustrates a top view of a furniture such as a chair with built-in joyride showing directions of two horizontal motions, according to an exemplary embodiment of the present invention.

FIG. 10A is a diagram that illustrates a top view 1000 of a chair 1002 with built-in joyride showing directions of two horizontal motions, according to an exemplary embodiment of the present invention. The two horizontal motions are along the horizontal X axis 104a and the horizontal Y axis 104b. As shown, the chair 1002 is configured to move in two horizontal directions such as the horizontal X axis 104a and the horizontal Y axis 104b. In an embodiment, the chair 1002 with a ride (hereinafter, may be referred to as the CWAR 1002) consists of one or more mechanical linear actuators. The linear actuators are controlled by a CWAR computer. The linear actuators may be either electrical or hydraulic or pneumatic actuators or any combination thereof. The CWAR computer may be a computing device and may include suitable logic, circuitry, interfaces, and/or code, executable by the circuitry, that may be configured to perform one or more operations. For example, the CWAR computer runs a program that a user can select. This program has the information on position, direction, speed, and movement. The CWAR computer also controls illumination and fan speed of one or more types of fans connected to the chair 1002. The CWAR computer may be realized through various web-based technologies, such as, but are not limited to, a Java web-framework, a .NET framework, a professional hypertext preprocessor (PHP) framework, a python framework, or any other web-application framework. The CWAR computer may also be realized as a machine-learning model that implements any suitable machine-learning techniques, statistical techniques, or probabilistic techniques. Examples of such techniques may include expert systems, fuzzy logic, support vector machines (SVM), Hidden Markov models (HMMs), greedy search algorithms, rule-based systems, Bayesian models (e.g., Bayesian networks), neural networks, decision tree learning methods, other non-linear training techniques, data fusion, utility-based analytical systems, or the like. Examples of the CWAR computer may include, but are not limited to, a built-in dedicated computer, a personal computer, a laptop, or a network of computer systems.

In an embodiment, the user could choose a ride using an application running on the user device such as a cell phone or a tablet computer. This cell phone or tablet computer may communicate with the CWAR computer to provide it the program or executing instructions for the ride. Once selected, the ride starts, and the user can enjoy the ride. The expectation is that experts will synchronize illumination, ride position, speed, direction and optional fan speeds with pieces of music or entertainment. In some embodiments, the users strap themselves to the chair 1002 and then choose a ride that will then start and will cause the movement of the chair 1002 along at least the horizontal X axis 104a and the horizontal Y axis 104b. The CWAR computer may then run the ride including the illumination and the fans according to this program. By making virtual reality equipment interface with the CWAR, unique user experiences may be created.

Figure 10B:
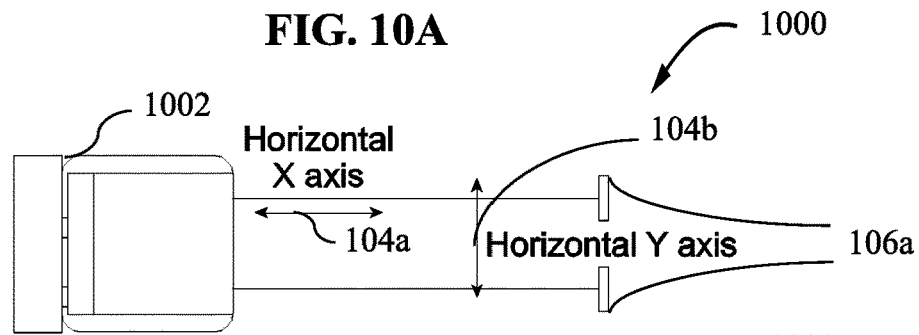
FIG. 10B is a diagram that illustrates a top view of the chair with built-in joyride showing directions of two horizontal motions with optional fans in a first position, according to an exemplary embodiment of the present invention.

FIG. 10B is a diagram that illustrates a top view 1000 of the chair 1002 with built-in joyride showing directions of two horizontal motions 104a and 104b with optional fans 106a in a first position, according to an exemplary embodiment of the present invention. The optional fans 106a may be removably attached to the first position of the chair 1002. In an exemplary embodiment, the first position may be located towards a leg side of the chair 1002. The user may control ON-OFF of the optional fans 106a by means of the user device. For example, the user, by means of a user application running on the user device, may select an option to turn ON the optional fans 106a. Based on the selection, the user device may communicate a turn ON signal to the CWAR computer (installed in the chair 1002) over a communication network. The CWAR computer may receive the turn ON signal from the user device. Thereafter, the CWAR computer may turn ON the optional fans 106a. Examples of types of the communication network may include, but are not limited to, a local area network, a wide area network, a radio network, a virtual private network, an internet area network, a metropolitan area network, a satellite network, Wi-Fi, Bluetooth Low energy, a wireless network, and a telecommunication network. Examples of the telecommunication network may include, but are not be limited to, a global system for mobile communication (GSM) network, a general packet radio service (GPRS) network, third Generation Partnership Project (3GPP), an enhanced data GSM environment (EDGE), and a Universal Mobile Telecommunications System (UMTS).

Similarly, the user may control ON-OFF of the horizontal motions 104a and 104b by means of the user device. For example, the user, by means of the user application running on the user device, may select an option to turn ON at least one of the horizontal motions 104a and 104b. Based on the selection, the user device may communicate a motion ON signal to the CWAR computer (installed in the chair 1002) over the communication network. The CWAR computer may receive the motion ON signal from the user device. Thereafter, the CWAR computer may turn ON at least one of the horizontal motions 104a and 104b. In some embodiments, the user may turn ON both of the optional fans 106a and the horizontal motions 104a and 104b to experience the joyride while relaxing on the chair 1002.

Figure 10C:
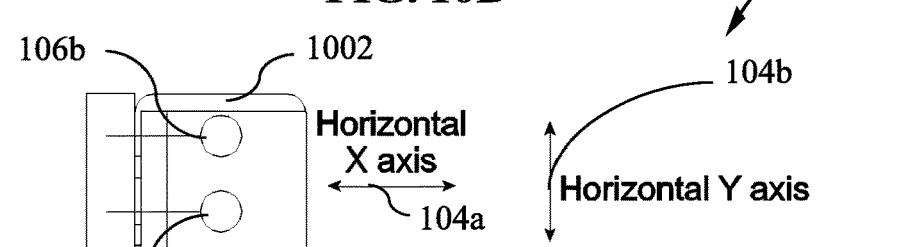
FIG. 10C is a diagram that illustrates a top view of the chair with built-in joyride showing directions of two horizontal motions with optional rotary fans in a second position over the chair, according to an exemplary embodiment of the present invention.

FIG. 10C is a diagram that illustrates a top view 1000 of the chair 1002 with built-in joyride showing directions of two horizontal motions 104a and 104b with optional rotary fans 106b in a second position over the chair 1002, according to an exemplary embodiment of the present invention. The optional rotary fans 106b may be removably attached to the second position of the chair 1002. In an exemplary embodiment, the second position may be located towards a head side of the chair 1002. The user may control ON-OFF of the optional rotary fans 106b by means of the user device. For example, the user, by means of the user application running on the user device, may select an option to turn ON the optional rotary fans 106b. Based on the selection, the user device may communicate a turn ON signal to the CWAR computer (installed in the chair 1002) over the communication network. The CWAR computer may receive the turn ON signal from the user device. Thereafter, the CWAR computer may turn ON the optional rotary fans 106b. Similarly, the user may control ON-OFF of the horizontal motions 104a and 104b by means of the user device. For example, the user, by means of the user application running on the user device, may select an option to turn ON at least one of the horizontal motions 104a and 104b. Based on the selection, the user device may communicate a motion ON signal to the CWAR computer (installed in the chair 1002) over the communication network. The CWAR computer may receive the motion ON signal from the user device. Thereafter, the CWAR computer may turn ON at least one of the horizontal motions 104a and 104b. In some embodiments, the user may turn ON both of the optional rotary fans 106b and the horizontal motions 104a and 104b to experience the joyride while relaxing on the chair 1002.

Figure 10D:
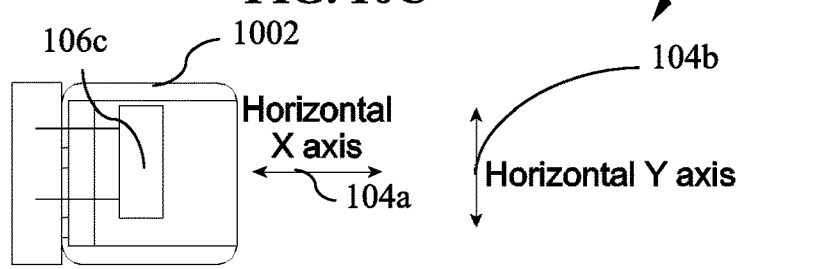
FIG. 10D is a diagram that illustrates a top view of the chair with built-in joyride showing directions of two horizontal motions with optional linear fans in the second position over the chair, according to an exemplary embodiment of the present invention.

FIG. 10D is a diagram that illustrates a top view 1000 of the chair 1002 with built-in joyride showing directions of two horizontal motions 104a and 104b with optional linear fans 106c in the second position over the chair 1002, according to an exemplary embodiment of the present invention. The optional linear fans 106c may be removably attached to the second position of the chair 1002. In an exemplary embodiment, the second position may be located towards a head side of the chair 1002. The user may control ON-OFF of the optional linear fans 106c by means of the user device. For example, the user, by means of the user application running on the user device, may select an option to turn ON the optional linear fans 106c. Based on the selection, the user device may communicate a turn ON signal to the CWAR computer (installed in the chair 1002) over the communication network. The CWAR computer may receive the turn ON signal from the user device. Thereafter, the CWAR computer may turn ON the optional linear fans 106c. Similarly, the user may control ON-OFF of the horizontal motions 104a and 104b by means of the user device. For example, the user, by means of the user application running on the user device, may select an option to turn ON at least one of the horizontal motions 104a and 104b. Based on the selection, the user device may communicate a motion ON signal to the CWAR computer (installed in the chair 1002) over the communication network. The CWAR computer may receive the motion ON signal from the user device. Thereafter, the CWAR computer may turn ON at least one of the horizontal motions 104a and 104b. In some embodiments, the user may turn ON both of the optional linear fans 106c and the horizontal motions 104a and 104b to experience the joyride while relaxing on the chair 1002.

Figure 10E:
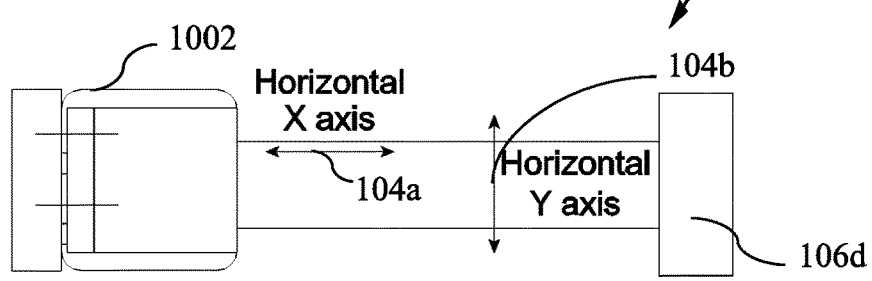
FIG. 10E is a diagram that illustrates a top view of the chair with built-in joyride showing directions of two horizontal motions with optional linear fans in the first position, according to an exemplary embodiment of the present invention.

FIG. 10E is a diagram that illustrates a top view 1000 of the chair 1002 with built-in joyride showing directions of two horizontal motions 104a and 104b with optional linear fans 106d in the first position, according to an exemplary embodiment of the present invention. The optional linear fans 106d may be removably attached to the first position of the chair 1002. In an exemplary embodiment, the first position may be located towards a leg side of the chair 1002. The user may control ON-OFF of the optional linear fans 106d by means of the user device. For example, the user, by means of the user application running on the user device, may select an option to turn ON the optional linear fans 106d. Based on the selection, the user device may communicate a turn ON signal to the CWAR computer (installed in the chair 1002) over the communication network. The CWAR computer may receive the turn ON signal from the user device. Thereafter, the CWAR computer may turn ON the optional linear fans 106*d*. Similarly, the user may control ON-OFF of the horizontal motions 104*a* and 104*b* by means of the user device. For example, the user, by means of the user application running on the user device, may select an option to turn ON at least one of the horizontal motions 104*a* and 104*b*. Based on the selection, the user device may communicate a motion ON signal to the CWAR computer (installed in the chair 1002) over the communication network. The CWAR computer may receive the motion ON signal from the user device. Thereafter, the CWAR computer may turn ON at least one of the horizontal motions 104*a* and 104*b*. In some embodiments, the user may turn ON both of the optional linear fans 106*d* and the horizontal motions 104*a* and 104*b* to experience the joyride while relaxing on the chair 1002.

FIGS. 10A-10E show the top view 1000 of the CWAR (i.e., the chair 1002) in a rectangular form factor. The figures also show a few ways linear or rotary fans can be attached to the CWAR. The computer built-in the CWAR controls the movements, illumination and fan speeds to create the user experience during the joyride. The figures show that the linear actuators can create horizontal x and y dimensional movements of the chair 1002.

Figure 11A:
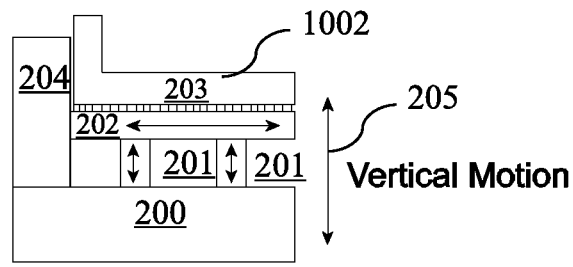
FIG. 11A is a diagram that illustrates a side view of the chair showing a vertical motion without the optional fans showing a vertical position that is somewhat open, according to an exemplary embodiment of the present invention.
Figure 14:
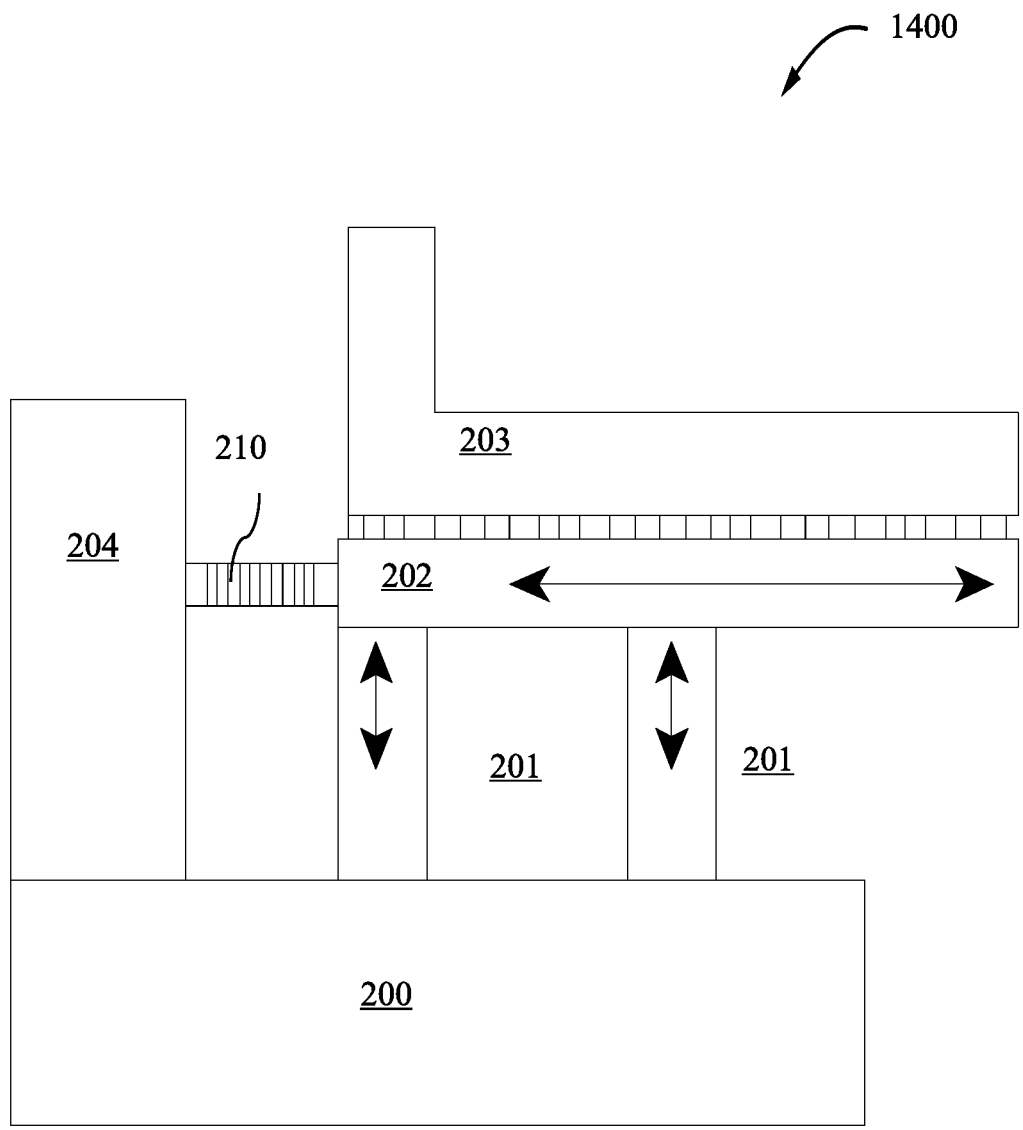
FIG. 14 is a diagram that illustrates a side view of the chair showing the vertical motion without the optional fans showing the vertical position that is quite open and horizontal X position quite open, according to an exemplary embodiment of the present invention.
Figure 15:
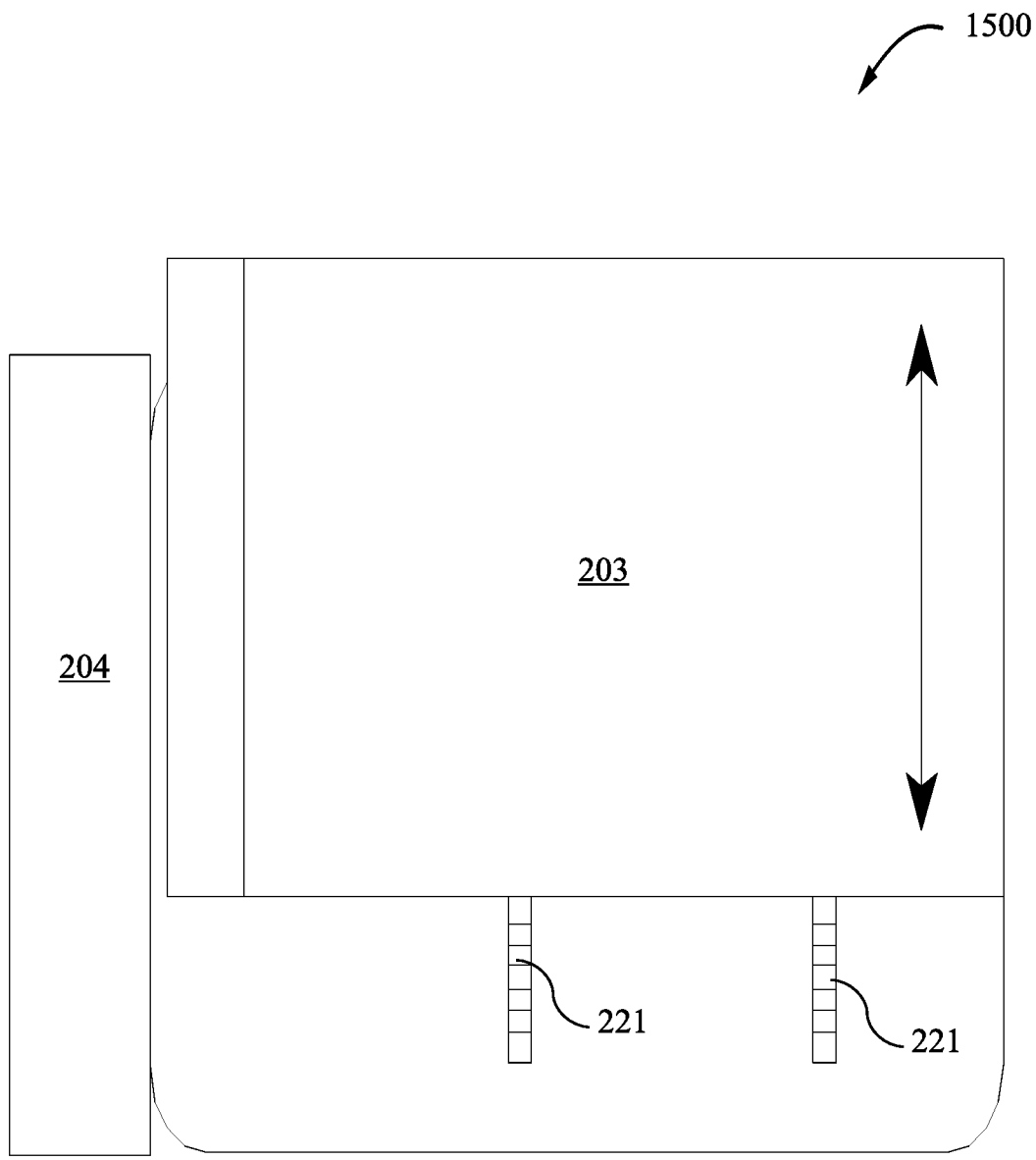
FIG. 15 is a diagram that illustrates a top view of the chair without the optional fans with horizontal Y position in one extreme, according to an exemplary embodiment of the present invention.

FIG. 11A is a diagram that illustrates a side view of the chair 1002 showing the vertical motion 205 without the optional fans showing a vertical position that is somewhat open, according to an exemplary embodiment of the present invention. FIG. 11A shows the side view of the chair 1002. A component 200 is a base associated with the chair 1002. Components 201 are the linear actuators used for producing the vertical movement 205. A component 204 is a head structure part of the chair 1002 that is an important part of the chair 1002. A component 202 is a surface that rests on top of the linear actuators 201. Also, the component 202 moves in the horizontal X direction pushed by a set of linear actuators (210 in FIG. 14). These linear actuators are mounted inside the head structure part 204 but they move in sync with the linear actuators 201. A component 203 is a horizontal board that sits on top of the component 202 and it moves on top of the component 202 based on the linear actuators (210 in FIG. 14) that are attached to the component 202. Even though the drawings show all linear actuators 201 being open or closed at the same time with the same height, this is also something that the CWAR computer controls individually for each linear actuator. By individually controlling each linear actuator, the CWAR computer can tilt the chair 1002 as part of the ride. The connections of the linear actuators 201 to the surface 202 needs to be done with hinges to allow this freedom of movement. The linear actuators 210 in FIG. 14 are also individually controlled by the CWAR computer. Similarly, the linear actuators 221 in FIG. 15 are also individually controlled by the CWAR computer. This allows for providing various tilts as part of the ride.

Figure 11B:
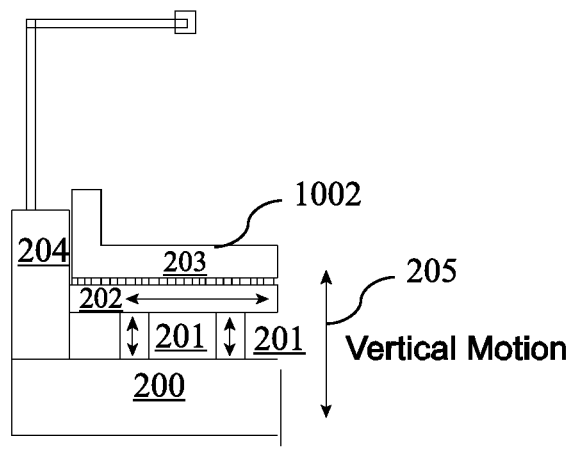
FIG. 11B is a diagram that illustrates a side view of the chair showing the vertical motion with the optional fans over the chair in the second position, according to an exemplary embodiment of the present invention.
Figure 11C:
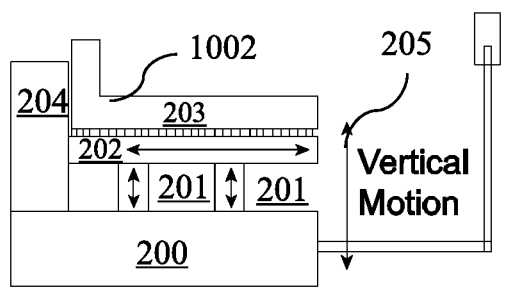
FIG. 11C is a diagram that illustrates a side view of the chair showing the vertical motion with the optional fans in the first position, according to an exemplary embodiment of the present invention.

FIG. 11B is a diagram that illustrates a side view of the chair 1002 showing the vertical motion 205 with the optional fans 106*b* or 106*c* over the chair 1002 in the second position, according to an exemplary embodiment of the present invention. The optional fans 106*b* or 106*c* may be removably attached to the second position i.e., the head structure part 204 of the chair 1002. FIG. 11C is a diagram that illustrates a side view of the chair 1002 showing the vertical motion with the optional fans 106*a* or 106*d* in the first position, according to an exemplary embodiment of the present invention. The optional fans 106*a* or 106*d* may be removably attached to the first position i.e., the base part 200 of the chair 1002. Along with controlling each linear actuator for facilitating the desired movement along at least one of the horizontal X axis 104*a*, the horizontal Y axis 104*b*, and the vertical axis 205, the CWAR computer also controls ON-OFF operation of each of the optional fans 106*a*, 106*b*, 106*c*, and 106*d*. The ON-OFF operation of each of the optional fans 106*a*, 106*b*, 106*c*, and 106*d* may be controlled based on the user's preferences provided by the user by means of the user application running on the user device. Alternatively, the ON-OFF operation of each of the optional fans 106*a*, 106*b*, 106*c*, and 106*d* may be controlled based on the user's preferences provided by the user by means of the CWAR computer. Further, the linear actuators may be operated in a controlled manner to facilitate rotary motion and 3D Stewart type of movements, either individually or in combination with the movements along at least one of the horizontal X axis 104*a*, the horizontal Y axis 104*b*, and the vertical axis 205.

Figure 12:
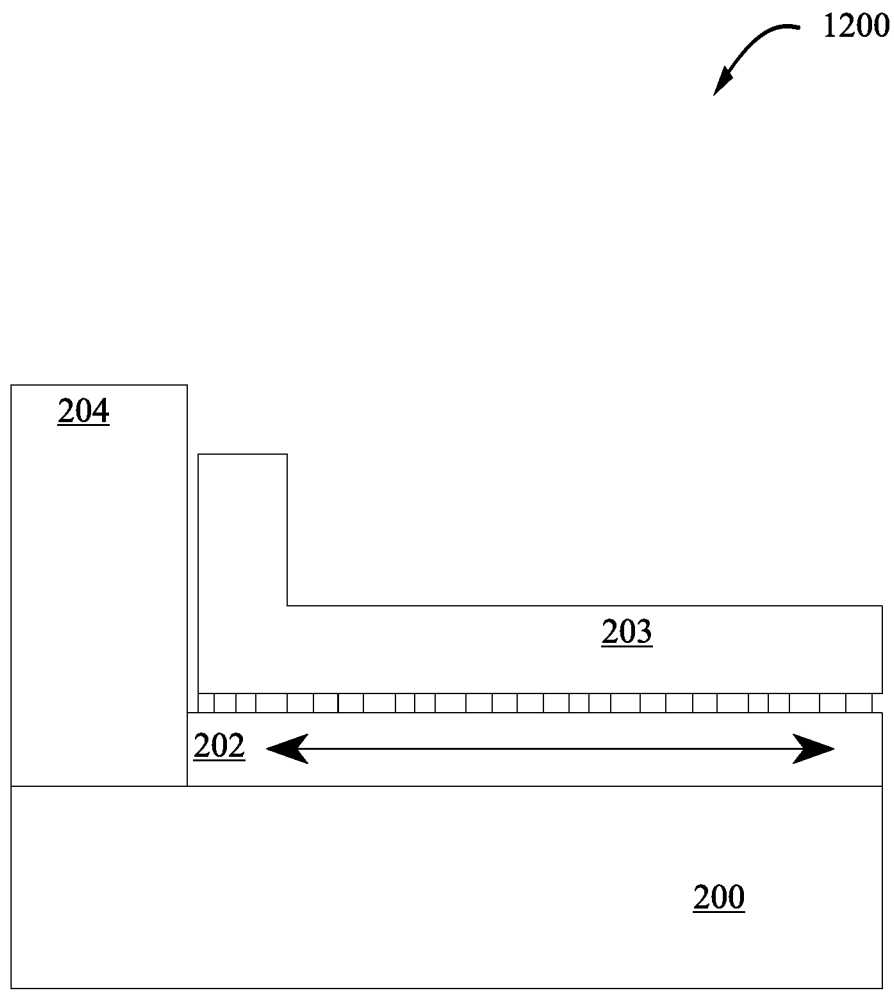
FIG. 12 is a diagram that illustrates a side view of the chair showing the vertical motion without the optional fans showing the vertical position that is closed, according to an exemplary embodiment of the present invention.

FIG. 12 is a diagram that illustrates a side view 1200 of the chair 1002 showing the vertical motion 205 without the optional fans showing the vertical position that is closed, according to an exemplary embodiment of the present invention. FIG. 12 shows the side view of the chair 1002. The component 200 is the base associated with the chair 1002. The component 204 is the head structure part of the chair 1002. The component 202 is the surface that rests on top of the linear actuators 201 (shown in FIGS. 11A-11C). Also, the component 202 moves in the horizontal X direction pushed by the set of linear actuators (210 in FIG. 14). These linear actuators are mounted inside the head structure part 204 but they move in sync with the linear actuators 201. The component 203 is the horizontal board that sits on top of the component 202 and it moves on top of the component 202 based on the linear actuators (210 in FIG. 14) that are attached to the component 202. Here, FIG. 12 illustrates the side view 300 of the chair 1002 with linear actuators 201 closed.

Figure 13:
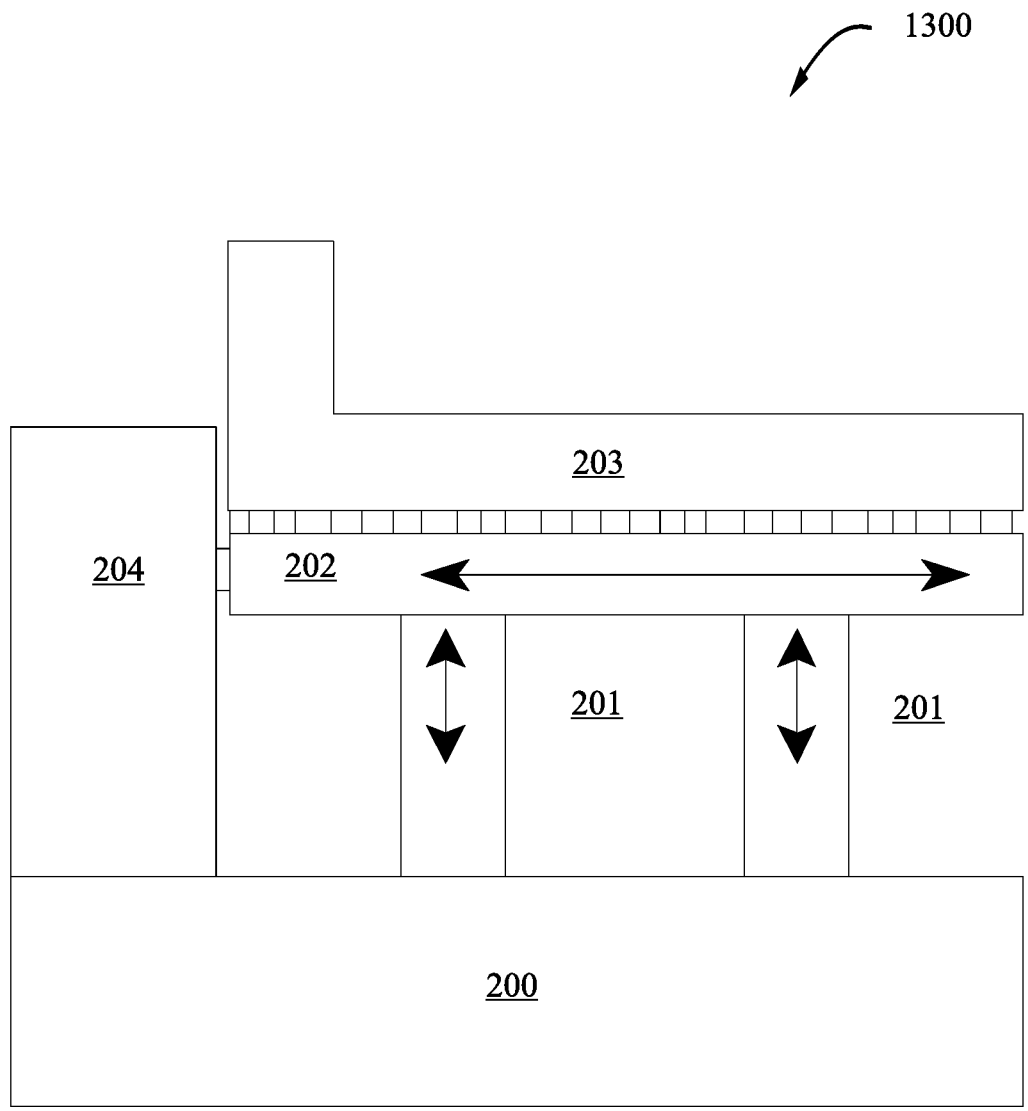
FIG. 13 is a diagram that illustrates a side view of the chair showing the vertical motion without the optional fans showing the vertical position that is quite open, according to an exemplary embodiment of the present invention.

FIG. 13 is a diagram that illustrates a side view 1300 of the chair 1002 showing the vertical motion 205 without the optional fans showing the vertical position that is quite open, according to an exemplary embodiment of the present invention. FIG. 13 shows the side view of the chair 1002. The component 200 is the base associated with the chair 1002. The component 204 is the head structure part of the chair 1002. The component 202 is the surface that rests on top of the linear actuators 201. Also, the component 202 moves in the horizontal X direction pushed by the set of linear actuators (210 in FIG. 14). These linear actuators are mounted inside the head structure part 204 but they move in sync with the linear actuators 201. The component 203 is the horizontal board that sits on top of the component 202 and it moves on top of the component 202 based on the linear actuators (210 in FIG. 14) that are attached to the component 202. Here, FIG. 13 illustrates the linear actuators 201 fully extended in the vertical side.

FIG. 14 is a diagram that illustrates a side view 1400 of the chair 1002 showing the vertical motion 205 without the optional fans showing the vertical position that is quite open and the horizontal X position quite open, according to an exemplary embodiment of the present invention. FIG. 14 shows the side view of the chair 1002. The component 200 is the base associated with the chair 1002. The component 204 is the head structure part of the chair 1002. The component 202 is the surface that rests on top of the linear actuators 201. Also, the component 202 moves in the horizontal X direction pushed by the set of linear actuators 210. These linear actuators 210 are mounted inside the head structure part 204 but they move in sync with the linear actuators 201. The component 203 is the horizontal board that sits on top of the component 202 and it moves on top of the component 202 based on the linear actuators 210 that are attached to the component 202. Here, FIG. 14 illustrates the side view 500 with the vertical linear actuators 201 extended as well as the horizontal linear actuators 210 extended. In some embodiments, the vertical linear actuators 201 and the horizontal linear actuators 210 may be operated for providing various tilts as part of the ride. The linear actuators 210 may be individually controlled by the CWAR computer. Similarly, the linear actuators 201 may also be individually controlled by the CWAR computer. This allows for providing various tilts as part of the ride.

FIG. 15 is a diagram that illustrates a top view 1500 of the chair 1002 without the optional fans with horizontal Y position in one extreme, according to an exemplary embodiment of the present invention. FIG. 15 shows the top view 1500 of the chair 1002. The component 204 is the head structure part of the chair 1002. The component 203 is the horizontal board that sits on top of the component 202. By individually controlling each linear actuator, the CWAR computer can tilt the chair 1002 as part of the ride. The connections of the linear actuators 201 to the surface 202 needs to be done with hinges to allow this freedom of movement. The linear actuators 210 in FIG. 14 are also individually controlled by the CWAR computer. Similarly, the linear actuators 221 are also individually controlled by the CWAR computer. This allows for providing various tilts as part of the ride. FIG. 15 shows the top view 1500 of the CWAR with the horizontal linear actuators 221 extended in the maximum Y position.

Figure 16:
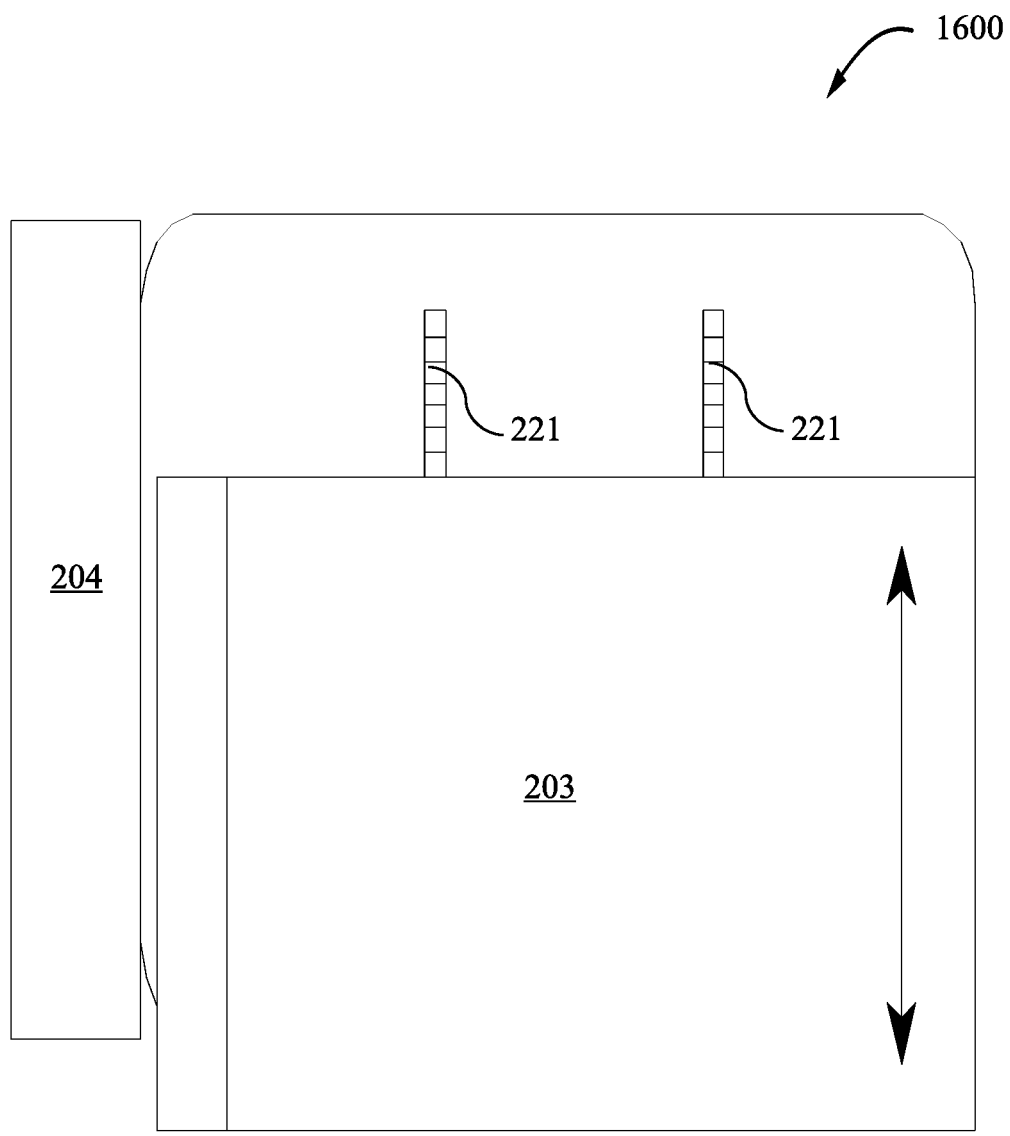
FIG. 16 is a diagram that illustrates a top view of the chair without the optional fans with the horizontal Y position in another extreme, according to an exemplary embodiment of the present invention.

FIG. 16 is a diagram that illustrates a top view 1600 of the chair 1002 without the optional fans with the horizontal Y position in another extreme, according to an exemplary embodiment of the present invention. FIG. 16 shows the top view 1600 of the CWAR with horizontal linear actuators 221 extended in the minimum Y position. FIG. 16 shows the top view 1600 of the chair 1002. The component 204 is the head structure part of the chair 1002. The component 203 is the horizontal board that sits on top of the component 202. By individually controlling each linear actuator, the CWAR computer can tilt the chair 1002 as part of the ride. The connections of the linear actuators 201 to the surface 202 needs to be done with hinges to allow this freedom of movement. The linear actuators 210 in FIG. 14 are also individually controlled by the CWAR computer. Similarly, the linear actuators 221 are also individually controlled by the CWAR computer. This allows for providing various tilts as part of the ride.

Figure 17:
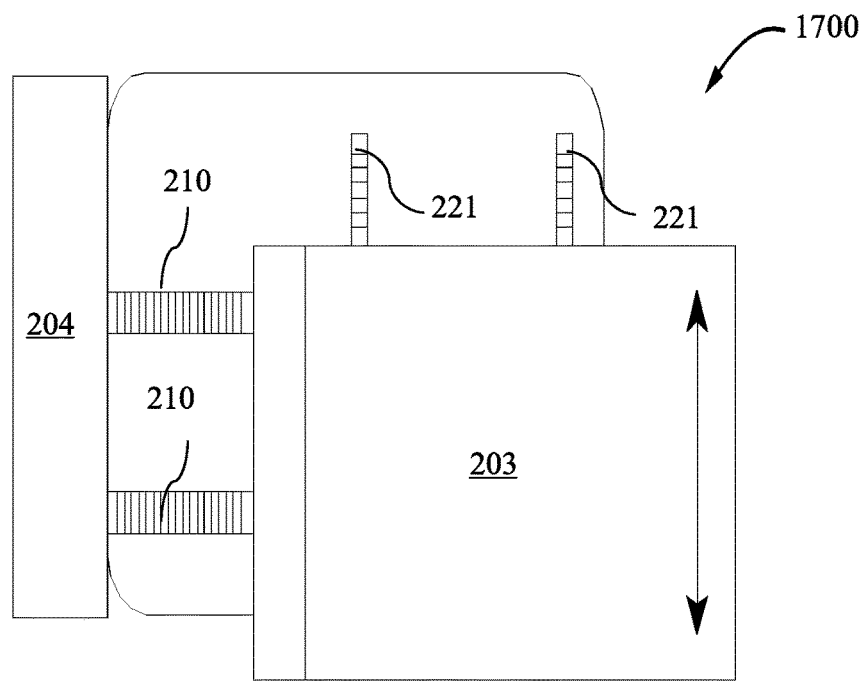
FIG. 17 is a diagram that illustrates a top view of the chair without the optional fans with the horizontal minimum Y position and maximum X position, according to an exemplary embodiment of the present invention.
Figure 18:
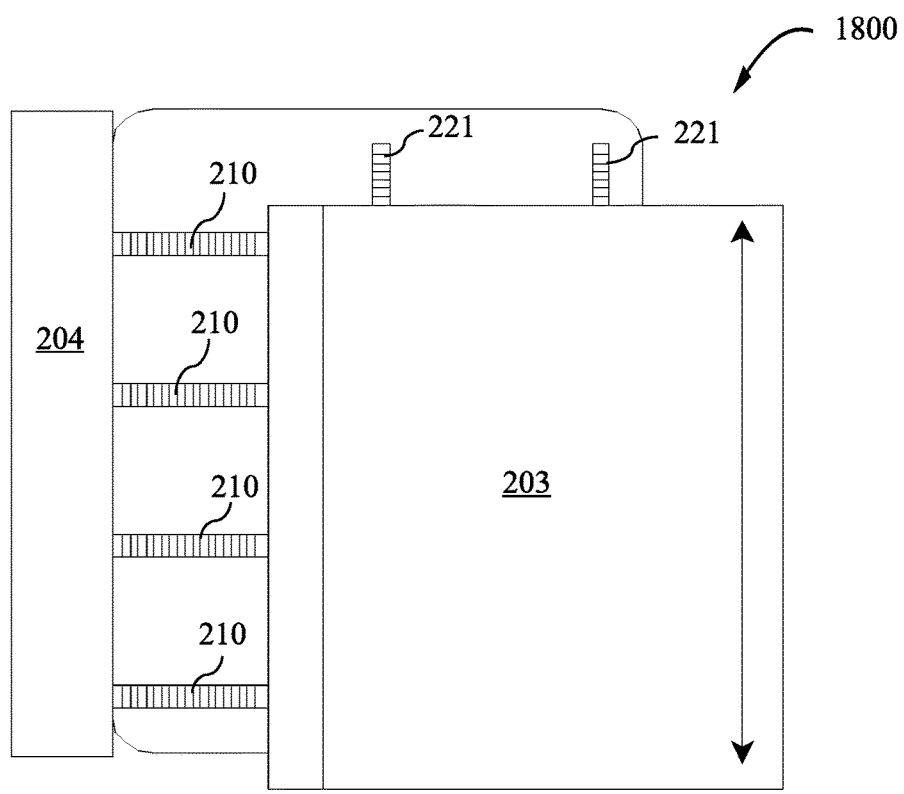
FIG. 18 is a diagram that illustrates a top view of the chair without the optional fans with the horizontal minimum Y position and maximum X position, according to another exemplary embodiment of the present invention.

FIG. 17 is a diagram that illustrates a top view 1700 of the chair 1002 without the optional fans with the horizontal minimum Y position and maximum X position, according to an exemplary embodiment of the present invention. FIG. 17 shows the top view 1700 of the CWAR with the horizontal minimum Y position and maximum X position. FIG. 17 shows the top view 800 of the chair 1002. The component 204 is the head structure part of the chair 1002. The linear actuators 210 are mounted inside the head structure part 204. The component 203 is the horizontal board that sits on top of the component 202. By individually controlling each linear actuator, the CWAR computer can tilt the chair 1002 as part of the ride. The connections of the linear actuators 201 to the surface 202 needs to be done with hinges to allow this freedom of movement. The linear actuators 210 in FIG. 14 are also individually controlled by the CWAR computer. Similarly, the linear actuators 221 are also individually controlled by the CWAR computer. This allows for providing various tilts as part of the ride. FIG. 18 is a diagram that illustrates a top view 1800 of the chair 1002 without the optional fans with the horizontal minimum Y position and maximum X position, according to another exemplary embodiment of the present invention.

In an embodiment, the CWAR may be configured to facilitate 3 different axis of motions (such as the horizontal X axis, the horizontal Y axis, or the vertical axis). Further, the CWAR may be configured to facilitate illumination control of the lights as well as fan speed control of the fans. The illumination control and fan speed control may be executed by providing appropriate inputs using the user device or the CWAR computer. It is possible that the user might need only one of these functionalities and the CWAR might only have one of these functionalities. For example, it might be a chair supporting only linear X axis motion using electrical, hydraulic, or pneumatic actuators controlled by the CWAR computer. There is a special mattress that is used with the CWAR. This is to make sure the users are safe in the CWAR when they are using the ride mode. The mattress has connectors through which one or more straps strap the mattress to the CWAR. Also, there is an attachment that goes around the mattress to provide extra comfort and safety during the ride. The attachment attaches to the mattress using a zip or Velcro like material.

The present invention discloses the apparatus for applying the three-dimensional motion including the vertical and horizontal motion to a furniture such as the chair 1002. The apparatus includes a mechanical frame with the linear actuators 201, 210, and 221 that are controlled by the CWAR computer. The supported motion may be along the horizontal X axis, the horizontal Y axis, the vertical motion, or any combination thereof as described above. In addition to the vertical and horizontal motion, the apparatus may also facilitate rotary motion and 3D Stewart type of movements. The linear actuators 201, 210, and 221 may correspond to electrical linear actuators, hydraulic actuators or pneumatic linear actuators, or any combination thereof. The apparatus can optionally control the illumination of lights and speeds of multiple fans (such as the fans 106a-106d) to provide the joyride experience to the user of the chair 1002. The CWAR computer that controls the movements of the chair 1002, illumination of the lights, and speeds of the fans may be programmed remotely by an application running on the user device such as a cellular device or another tablet, laptop or another computer. The movements of the chair 1002, illumination of the lights, the speeds of the fans may also be programmed by a remote device using an easy to use interface. Experts in a field of synchronizing the music to the movements can create files to capture the movements, illumination, fan speeds information with respect to a piece of music, entertainment, or the like. These files with synchronized information may be hosted on remote servers. These files may also be remotely downloaded to the CWAR computer that controls the movements of the chair 1002, illumination of the lights, speeds of the furniture fans, or the music. This can provide the user a unique experience with entertainment synchronized with movements, illumination as well as effect of fans. The apparatus may be created and used with a subset of features such as only horizontal movement in one or more directions without any other movement. Thus, by way of the CWAR disclosed in the present invention, the CWAR facilitates a way of enjoying music or other entertainment with the addition of movement and illumination in the privacy of a personal space. The user can enjoy exciting and relaxing movements within the privacy of a personal space. The user can use the personal room space more efficiently by also including the joyride (by installing the CWAR) in the same space. Such experiences can also be included by any hospitality business without significant new expenses of creating the joyride. Any user can add an active distraction in the private space by using the effect of synchronized music, movement and illumination by installing the CWAR disclosed in the present invention. A private experience of movement, illumination and music to be enjoyed with significant others in a private space without crowds. An enhanced virtual reality experience when special content can be created tailored to the chair 1002 with the ride.

Figure 19:
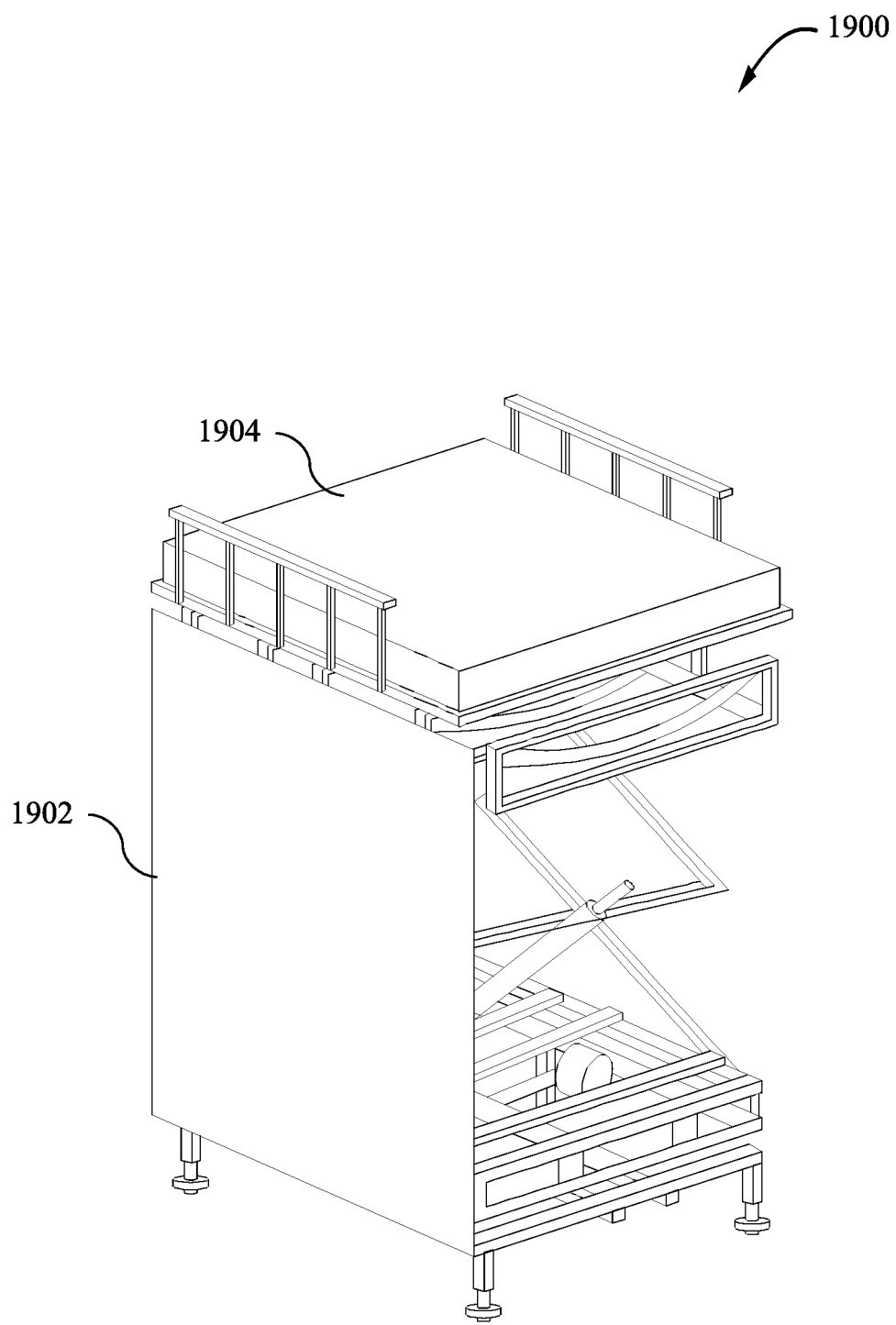
FIG. 19 is a diagram that shows a cover that is used for the furniture to prevent users or pets/people near the furniture from accessing moving parts of the furniture, according to an exemplary embodiment of the present invention.

FIG. 19 is a diagram 1900 that shows a cover 1902 that is used for the furniture (such as the bed 102 or the chair 1102) to prevent users or pets/people near the furniture from accessing moving parts of the furniture, according to an exemplary embodiment of the present invention. It shows the cover 1902 in open position. The furniture is shown with the mattress 1904. Below the mattress is shown various moving parts of the furniture. When the furniture is turned ON for the joyride, the various moving parts move in one or more directions as per the selected mode of operations. In such a case, the users or pets/people near the furniture may come in contact with the moving parts, which in turn can cause accidents. The cover 1902 is used with the furniture to prevent the users or pets/people near the furniture from accessing the various moving parts of the furniture, thereby ensuring safety and security of the users or pets/people near the furniture. In FIG. 19, the cover 1902 is shown in the open position. Further, the cover 1902 has been used along only one side of the furniture. Similar covers may be used along other sides of the furniture to prevent the users or pets/people near the furniture from accessing the various moving parts of the furniture.

Figure 20:
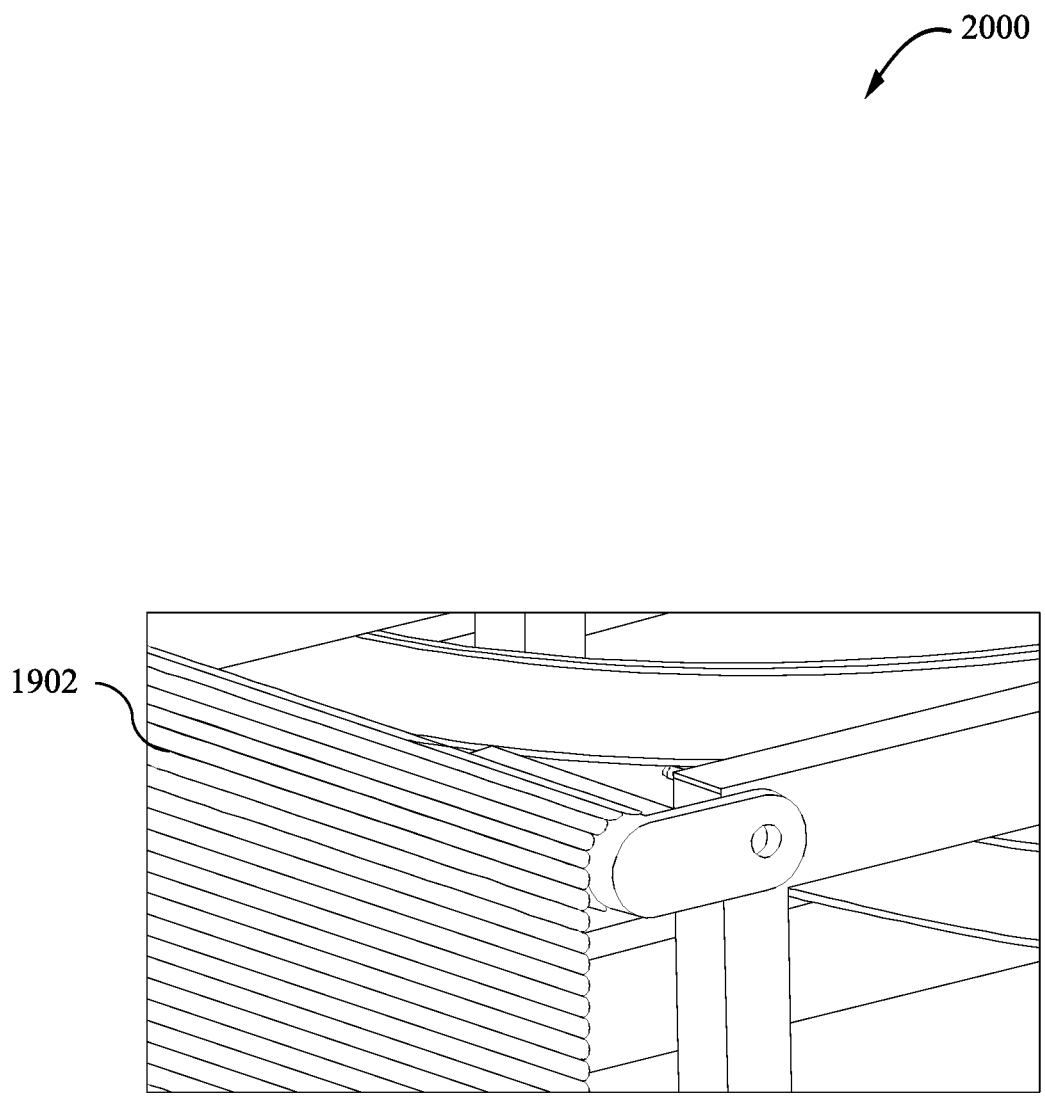
FIG. 20 is a diagram that shows a mechanism of the cover, according to an exemplary embodiment of the present invention.

FIG. 20 is a diagram 2000 that shows a mechanism of the cover 1902, according to an exemplary embodiment of the present invention. The cover 1902 opens as the furniture moves in a vertical direction. It is envisioned that such covers will full cover the moving parts of the furniture to prevent the users or pets/people from accessing the moving parts of the furniture. Further, the cover 1902 automatically opens as the furniture moves in the vertical direction i.e., during the vertical motion while stretching from zero vertical gap to a predefined vertical gap. Similarly, the cover 1902 automatically closes as the furniture moves in the vertical direction i.e., during the vertical motion from a predefined vertical gap to a zero vertical gap. The opening and closing of the cover 1902 during the vertical motion may be facilitated by a rolling motion of the cover 1902 along a horizontal cylindrical section (such as pipe). Thus, as the furniture moves along the vertical direction, the cover 1902 stretches itself from the horizontal cylindrical section and opens up to cover the moving parts to prevent the users or pets/people near the furniture from accessing the various moving parts of the furniture, or rolls around the horizontal cylindrical section.

Figure 21:
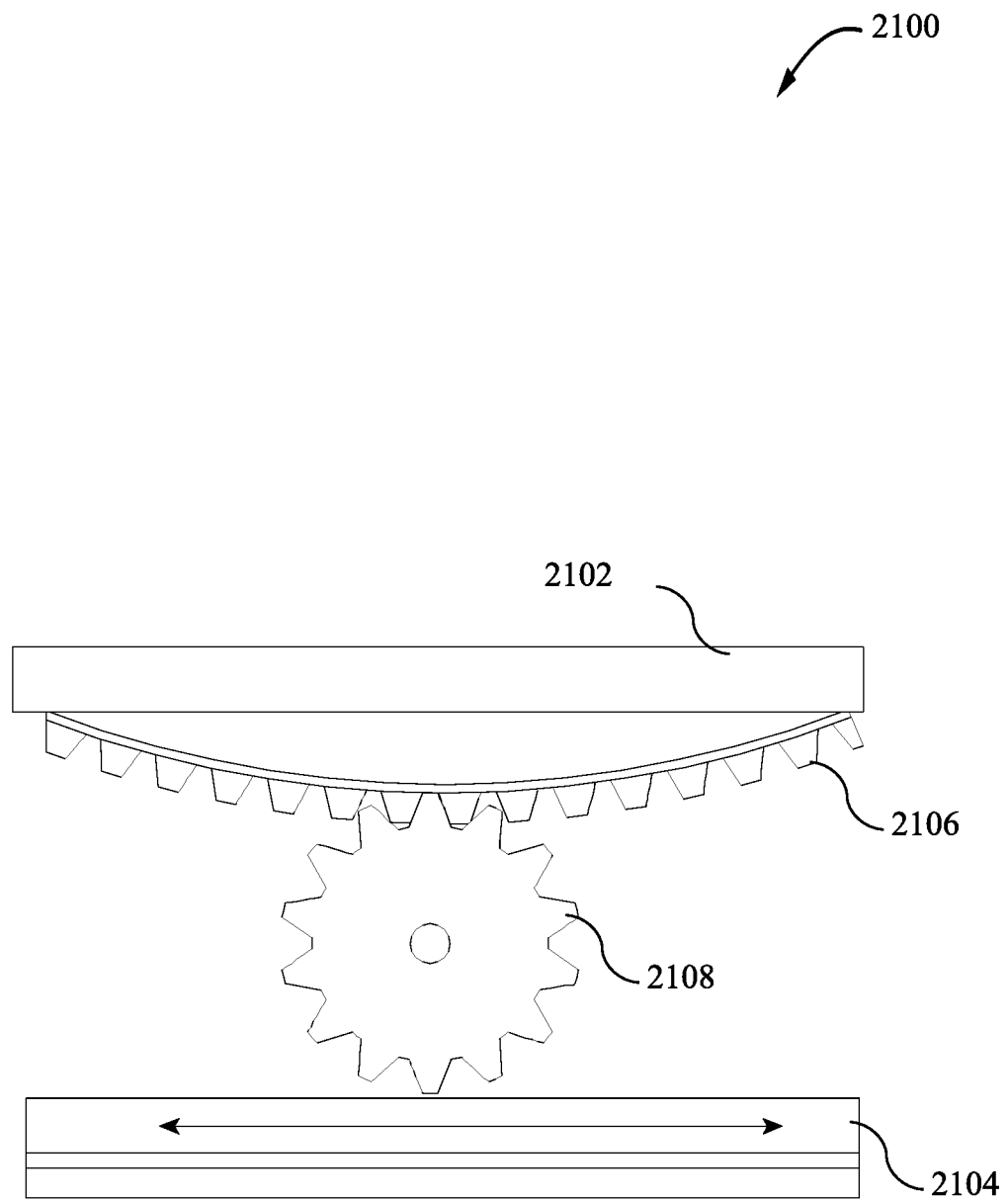
FIG. 21 is a diagram that shows a mechanism of providing rolling motion for the furniture, according to an exemplary embodiment of the present invention.

FIG. 21 is a diagram 2100 that shows a mechanism of providing rolling motion for the furniture (such as the bed 102 or the chair 1102), according to an exemplary embodiment of the present invention. In FIG. 21, there is shown a top part 2102 of the furniture (such as the bed 102 or the chair 1102). There is further shown a bottom part 2104 of the furniture (such as the bed 102 or the chair 1102). There is further shown an arc gear 2106 and a full gear 2108. The arc gear 2106 is connected to the top part 2102 of the furniture. The full gear 2108 is connected to a motor gearbox and the bottom part 2104 of the furniture. Further, the arc gear 2106 and the full gear 2108 engages into each other to provide the rolling motion for the furniture based on the motion of the motor gearbox of the motors of the furniture during the joyride operation. During the rolling motion, a toothed wheel of the arc wheel 2106 engages with a toothed wheel of the full gear 2108 to alter the relation between the speed of a driving mechanism (such as the driving motor) and the speed of the driven parts (the wheels), thereby facilitating the rolling motion for the furniture.

Figure 22:
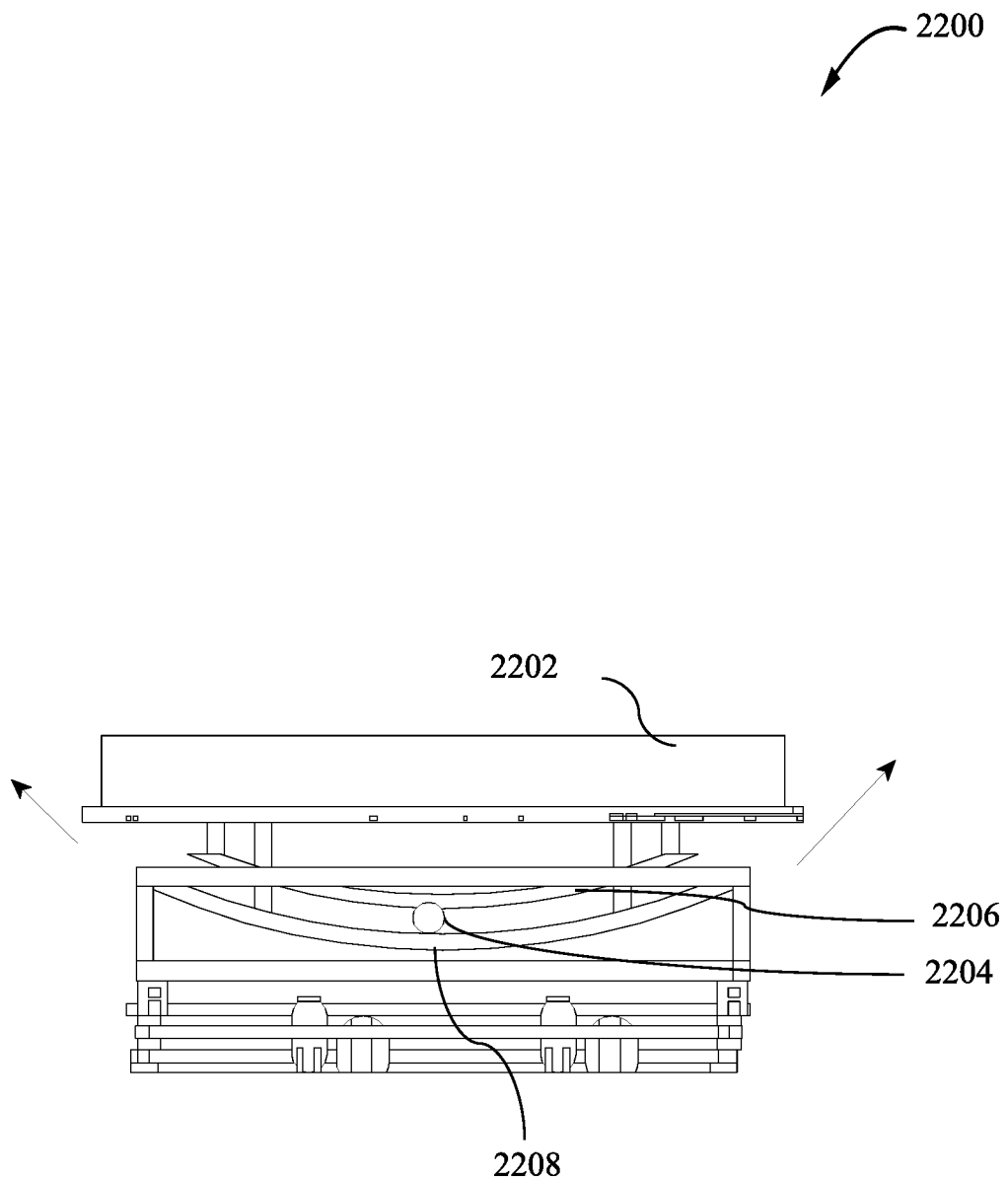
FIG. 22 is a diagram that shows how the rolling motion for the furniture can be used in a stacked manner on top of the mechanism to provide horizontal and vertical motions, according to an exemplary embodiment of the present invention.

FIG. 22 is a diagram 2200 that shows how the rolling motion for the furniture (such as the bed 102 or the chair 1102) can be used in a stacked manner on top of the mechanism to provide horizontal and vertical motions, according to an exemplary embodiment of the present invention. In FIG. 22, there is shown a mattress 2202 of the furniture, a ball bearing 2204, a first rolling element 2206, and a second rolling element 2208. The ball bearing 2204 is placed between the first rolling element 2206 and the second rolling element 2208. During the horizontal and vertical motions, the ball bearing 2204 moves, which in turn causes the movement of the first rolling element 2206 and the second rolling element 2208, thereby facilitating the rolling motion of the furniture along with the horizontal and vertical motions. In some embodiments, during the horizontal and vertical motions, the first rolling element 2206 and the second rolling element 2208 rotates along its own axis by means of the ball bearing 2204, thereby facilitating the rolling motion of the furniture along with the horizontal and vertical motions.

Figure 23:
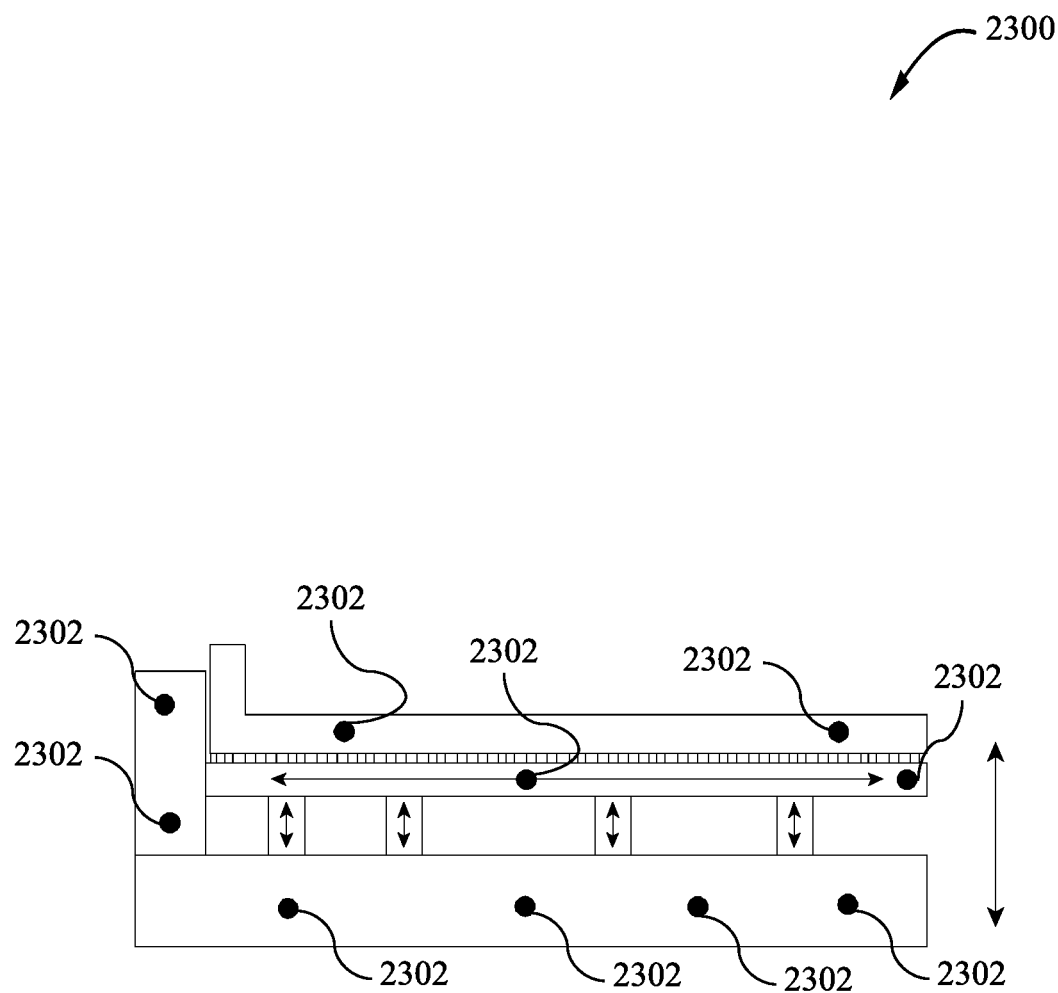
FIG. 23 is a diagram that shows proximity sensors integrated with the furniture to detect people/pets near the furniture, according to an exemplary embodiment of the present invention.

FIG. 23 is a diagram 2300 that shows proximity sensors 2302 integrated with the furniture to detect people/pets near the furniture, according to an exemplary embodiment of the present invention. The proximity sensors 2302 placed around the furniture can make sure that the movement of the furniture does not hit anyone near the furniture. If the proximity sensors 2302 trigger, the motion of the furniture may be slowed or stopped to avoid injuries. In addition to the proximity sensors 2302, the furniture may also include other built-in sensors, such as position sensors, level sensors, force sensors, optical cameras or optical sensors, temperature sensors, accelerometers, gyro-sensors, vibration sensors, or other sensors, that provide inputs to a built-in computer of the furniture having joyride mechanism. This computer may use these inputs to determine the safety of users or people/pets near the furniture and generate alerts. Further, the computer may use these inputs to control the actuators and other mechanical or electrical components to provide a safe and enjoyable experience to the users of the furniture. The position sensors may be used by the computer to figure out when to stop motors of the furniture or reverse the motors depending on where the moving part of the furniture is. For example, for a bed, if the bed has moved to the extreme "x" value, the position sensors may indicate that to the computer. At that point, the computer will no longer supply current to the motors to drive it in the same direction. The level sensors may help determine the extreme position in case of hydraulic or pneumatic linear actuators. However, the position sensors may also be used in conjunction with the hydraulic or pneumatic actuators. The optical sensors or cameras can also serve the same purpose by making sure that the movement of the furniture does not hit anyone occupying the furniture or near the furniture. The force sensors are used in the furniture to make sure that the load is not exceeding the capacity of the actuators or the built-in frame to make sure that it does not malfunction and cause injuries to the occupants or those near it. The temperature sensors near the motors, actuators, and on the moving components may sense the temperature. The computer may use this data to make sure that these components are not overheating that may lead to malfunction of the furniture or cause other safety or comfort issues. The vibration sensors may provide data to the computer. Such data can be used to determine that the ongoing ride is within acceptable parameters so that the ride is enjoyable. The accelerometers may detect when the load is out of balance and the computer using that input can then switch OFF or slow down the motors to make sure the acceleration is within limits and the users do not get thrown out of the furniture. This will also make sure the ride remains comfortable to the users. Similarly, the gyro-sensors may be used to determine angular velocity, vibration sensing, and angle sensing to make the ride safe and enjoyable for the users.

FIG. 24 is a diagram 2400 that shows temperature sensors 2402 integrated near motors and other moving areas of the furniture to detect that the temperature is within acceptable range of operation, according to an exemplary embodiment of the present invention. There can be more temperature sensors 2402 placed near the mattress or cushions to make sure the temperature there is acceptable to not cause hazardous conditions. The temperature sensors 2402 near the motors, actuators, and on the moving components may sense the temperature. The computer may use this data to make sure that these components are not overheating that may lead to malfunction of the furniture or cause other safety or comfort issues.

FIG. 25 is a diagram 2500 that shows position 2502 where the accelerometer, gyro sensors, or vibration sensors may be placed in operation, according to an exemplary embodiment of the present invention. It also shows the position 2504 where the force sensors could be placed. The accelerometers may detect when the load is out of balance and the computer using that input can then switch OFF or slow down the motors to make sure the acceleration is within limits and the users do not get thrown out of the furniture. This will also make sure the ride remains comfortable to the users. Similarly, the gyro-sensors may be used to determine angular velocity, vibration sensing, and angle sensing to make the ride safe and enjoyable for the users. The vibration sensors may provide data to the computer. Such data can be used to determine that the ongoing ride is within acceptable parameters so that the ride is enjoyable.

A person of ordinary skill in the art will appreciate that embodiments and exemplary scenarios of the disclosed subject matter may be practiced with various computer system configurations, including multi-core multiprocessor systems, minicomputers, mainframe computers, computers linked or clustered with distributed functions, as well as pervasive or miniature computers that may be embedded into virtually any device. Further, the operations may be described as a sequential process, however some of the operations may in fact be performed in parallel, concurrently, and/or in a distributed environment, and with program code stored locally or remotely for access by single or multiprocessor machines. In addition, in some embodiments, the order of operations may be rearranged without departing from the spirit of the disclosed subject matter.

Techniques consistent with the disclosure provide, among other features, an apparatus that facilitates a joyride mechanism in a furniture such as a bed, chair, sofa, crib, and the like, having attachments designed to impart a movement to the furniture for enjoyment purposes. Thus, the present invention discloses a system for imparting up to three-dimensional motion to a furniture (such as the bed 102 or the chair 1002) that comprises a base of the furniture. The system further comprises an apparatus to provide up to three-dimensional movement to the furniture. The system further comprises a computer to control illumination, position, movement, direction, speed of the furniture, and speed of fans connected to the furniture. Further, there is an application running on a user device or the computer to program the illumination, position, movement, direction, speed of the furniture, and the speed of fans connected to the furniture. Further, there is a program to synchronize the illumination, position, movement, direction, speed of the furniture, and the speed of fans connected to the furniture, to a piece of music or entertainment, wherein the program also synchronizes sources of the illumination to the piece of music or entertainment and the movement of the furniture. The means for imparting the movement comprises a set of linear actuators activated by electric motors or activated hydraulically or pneumatically or activated by a combination of electric motors, hydraulic actuators or pneumatic actuators. Further, a computer language is used to encode the position, speed, direction and optionally illumination and movement of a moving object such as the furniture to the piece of music or entertainment. The computer includes software to control the position, movement, direction, speed of the furniture. The software is further executed to play the synchronized music and optionally illumination while controlling the position, movement, direction and speed of the furniture. The application on the user device or the computer is further used to program the position, movement, speed, and direction of the furniture. The program can optionally encode the illumination to go with the piece of music or entertainment and the position, movement, speed, and direction of the furniture. The system further comprises a server for hosting files or programs including the position, movement, speed, direction, and optionally illumination of the furniture with respect to the piece of music, songs, or other entertainment. The system further comprises a mattress or an attachment to the mattress for use with the furniture. The mattress or the attachment to the mattress is provided with built-in straps and connectors to enjoy the furniture with a built-in joyride. The movement correspond to a horizontal X axis movement, a horizontal Y axis movement, and a vertical movement. Further, the movement correspond a rotary motion and 3D Stewart type of movement. While various exemplary embodiments of the disclosed systems and methods have been described above, it should be understood that they have been presented for purposes of example only, and not limitations. It is not exhaustive and does not limit the disclosure to the precise form disclosed. Modifications and variations are possible in light of the above teachings or may be acquired from practicing of the disclosure, without departing from the breadth or scope.

While various embodiments of the disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claims.

Although particular embodiments of the invention have been described in detail for purposes of illustration, various modifications and enhancements may be made without departing from the spirit and scope of the invention. The scope of the invention is accordingly defined by the following claims.

We claim:

1. A system for imparting three-dimensional movement to a furniture that comprises:
   a base of the furniture and a plurality of notches of the furniture, wherein the plurality of notches are provided to strap a mattress to the furniture;
   an apparatus to provide the three-dimensional movement to the furniture, wherein the three-dimensional movement includes movement along a horizontal x-axis, a horizontal y-axis, and a vertical axis, and wherein the mattress does not slip over the furniture when the furniture is moving along the horizontal x-axis, the horizontal y-axis, and the vertical axis when the mattress is strapped to the furniture using the plurality of notches;
   a computer to control illumination of light of the furniture, position, movement, direction, and speed of the furniture along the horizontal x-axis, the horizontal y-axis, and the vertical axis, and speed of fans connected to the furniture;
   an application on a user device or the computer to program the illumination of the light of the furniture, the position, movement, direction, and speed of the furniture, and the speed of fans connected to the furniture; and
   a program to synchronize the illumination of the light of the furniture, the position, movement, direction, and speed of the furniture, and the speed of fans connected to the furniture, to a piece of music.

2. The system of claim 1, wherein means for imparting the horizontal and vertical movement comprises:
   a plurality of linear actuators that can be activated by electric motors or activated hydraulically or pneumatically or activated by a combination of electric motors, hydraulic actuators and pneumatic actuators,
   wherein a first set of linear actuators from the plurality of linear actuators are installed below a horizontal component of the furniture for producing the movement along the vertical axis, and
   wherein a second set of linear actuators from the plurality of linear actuators are installed inside a head structure part of the furniture, wherein the horizontal component moves along the horizontal x-axis as pushed by the second set of linear actuators, and
   wherein the first set of linear actuators are different from the second set of linear actuators.

3. The system of claim 1, wherein a computer language is used to encode the position, speed, direction and optionally illumination and movement of the furniture to the piece of music.

4. The system of claim 1, wherein the computer includes software to control the position, movement, direction, and speed of the furniture, wherein the software is further executed to play the synchronized music and optionally illumination while controlling the position, movement, direction and speed of the furniture.

5. The system of claim 1, wherein the application on the user device or the computer is used to program the position, movement, speed, and direction of the furniture, wherein the program can optionally encode the illumination to go with the piece of music and the position, movement, speed, and direction of the furniture.

6. The system of claim 1, further comprising a server for hosting files or programs including the position, movement, speed, direction, and optionally illumination of the furniture with respect to the piece of music, songs, or other entertainment.

7. The system of claim 1, wherein the mattress or an attachment to the mattress is provided with built-in straps and connectors to enjoy the furniture with a built-in joyride, wherein the straps pass through the connectors to strap the mattress to the furniture.

8. The system of claim 1, wherein the furniture corresponds to at least one of a bed, a chair, a sofa, and a crib.

9. The system of claim 1, wherein the movement is triggered by a plurality of actuators based on an input request initiated by an occupant of the furniture.

10. The system of claim 9, wherein the movement corresponds to a rotary motion and 3D Stewart type of movement.

11. The system of claim 1, wherein the furniture is bed having a bed form factor of a moving machine for enjoying virtual reality.

12. The system of claim 1, wherein the furniture is a sofa, chair, chaise or other form furniture having a sofa, chair, chaise or other form furniture factor of a moving machine for enjoying virtual reality.

13. The system of claim 1, wherein the furniture includes built-in sensors to prevent injuries to occupants or people/pets near the furniture, and wherein the built-in sensors include at least position sensors, level sensors, force sensors, proximity sensors, optical sensors, temperature sensors, accelerometers, gyro-sensors, and vibration sensors.

14. The system of claim 13, wherein the furniture with the built-in sensors is provided to make sure that the movement of the furniture is measured and data is given to the computer, wherein the computer can use the data to ensure that the movement is a pleasurable experience for occupants of the furniture, and
   wherein the computer can use inputs from the built-in sensors to control actuators and other mechanical or electrical components to provide a safe and enjoyable experience for the occupants of the furniture.

15. The system of claim 1, further comprising a cover for a piece of furniture, wherein the cover covers moving parts to make sure that it is safe for occupants/people or pets near the furniture.

16. The system of claim 1, wherein a piece of software application is running on a mobile device or a computer or a touchscreen device, wherein the software application facilitates for selecting a program to run on the computer built-into the furniture, wherein the program that is selected is for a joyride for occupants of the furniture.

17. The system of claim 1, wherein the fan(s) are installed on a leg side of the furniture.

18. The system of claim 1, wherein the fan(s) are installed on a head side of the furniture.

* * * * *